United States Patent [19]

Zhiglinsky et al.

[11] Patent Number: 5,428,635
[45] Date of Patent: Jun. 27, 1995

[54] MULTI-WAVELENGTH TUNABLE LASER

[75] Inventors: Andrei G. Zhiglinsky; Alexander M. Izmailov, both of St. Petersburg,

[73] Assignee: American Biogenetic Sciences, Inc., Copiague, N.Y.

[21] Appl. No.: 190,753

[22] Filed: Feb. 1, 1994

Related U.S. Application Data

[63] Continuation-in-part of Ser. No. 185,609, Jan. 24, 1994, which is a continuation-in-part of Ser. No. 180,401, Jan. 11, 1994, Pat. No. 5,418,804, Ser. No. 180,408, Jan. 11, 1994, Pat. No. 5,418,803, and Ser. No. 180,407, Jan. 11, 1994, Pat. No. 5,418,805.

[51] Int. Cl.⁶ .............................................. H01S 3/08
[52] U.S. Cl. ........................................ 372/92; 372/96; 372/102; 372/68; 372/50; 372/64; 372/6; 372/20
[58] Field of Search .................. 372/23, 98, 92, 69, 372/6, 70, 9, 64, 102, 68, 50, 20

[56] References Cited

U.S. PATENT DOCUMENTS

| | | |
|---|---|---|
| 3,735,280 | 5/1973 | Johnston, Jr. . |
| 3,774,121 | 11/1973 | Ashkin et al. . |
| 3,928,817 | 12/1975 | Chodzko . |
| 3,993,963 | 11/1976 | Logan et al. . |
| 4,021,845 | 5/1977 | Wang .................. 372/56 |
| 4,173,738 | 11/1979 | Boling et al. . |
| 4,287,486 | 9/1981 | Javan . |
| 4,494,235 | 1/1985 | Guch, Jr. et al. . |
| 4,502,144 | 2/1985 | Suhre . |
| 4,710,937 | 12/1987 | Oomori et al. . |
| 4,731,794 | 3/1988 | Schafer . |
| 4,759,026 | 7/1988 | Hollins et al. . |
| 4,821,280 | 4/1989 | Kawase . |
| 4,945,544 | 7/1990 | Tanaka et al. . |
| 5,131,002 | 7/1992 | Mooradian . |

FOREIGN PATENT DOCUMENTS

| | | |
|---|---|---|
| 1718313A1 | 7/1991 | Russian Federation . |
| 1778840A1 | 11/1992 | Russian Federation . |
| 1778841A1 | 11/1992 | Russian Federation . |

OTHER PUBLICATIONS

K. W. Murphy, "An Integrated Optics Technology for the Production of Photocor ™ Fiber-Optic Components", *Corning—Technical Report*, Sep. 1988, pp. 1–12.
BT&D Technologies' Brochure for "SOA1100 and SOA3100 Semiconductor Optical Amplifier", Publication No. DS007, Revision 2, Sep. 28, 1992, pp. 1–5.

*Primary Examiner*—Léon Scott, Jr.
*Attorney, Agent, or Firm*—Pennie & Edmonds

[57] ABSTRACT

A laser capable of generating polychromatic or white light radiation is realized by employing dispersive and reflecting elements as the ends of a simple laser resonator cavity. The dispersive element either solely or in combination with an intracavity lens is arranged such that each wavelength component of the white light radiation is amplified by a different portion of the active medium. More specifically, forced oscillation or positive feedback for each wavelength component is achieved by operating a diffraction grating in an auto-collimation configuration or through the use of a distributed bragg reflector having a spatially varying index of refraction.

43 Claims, 26 Drawing Sheets

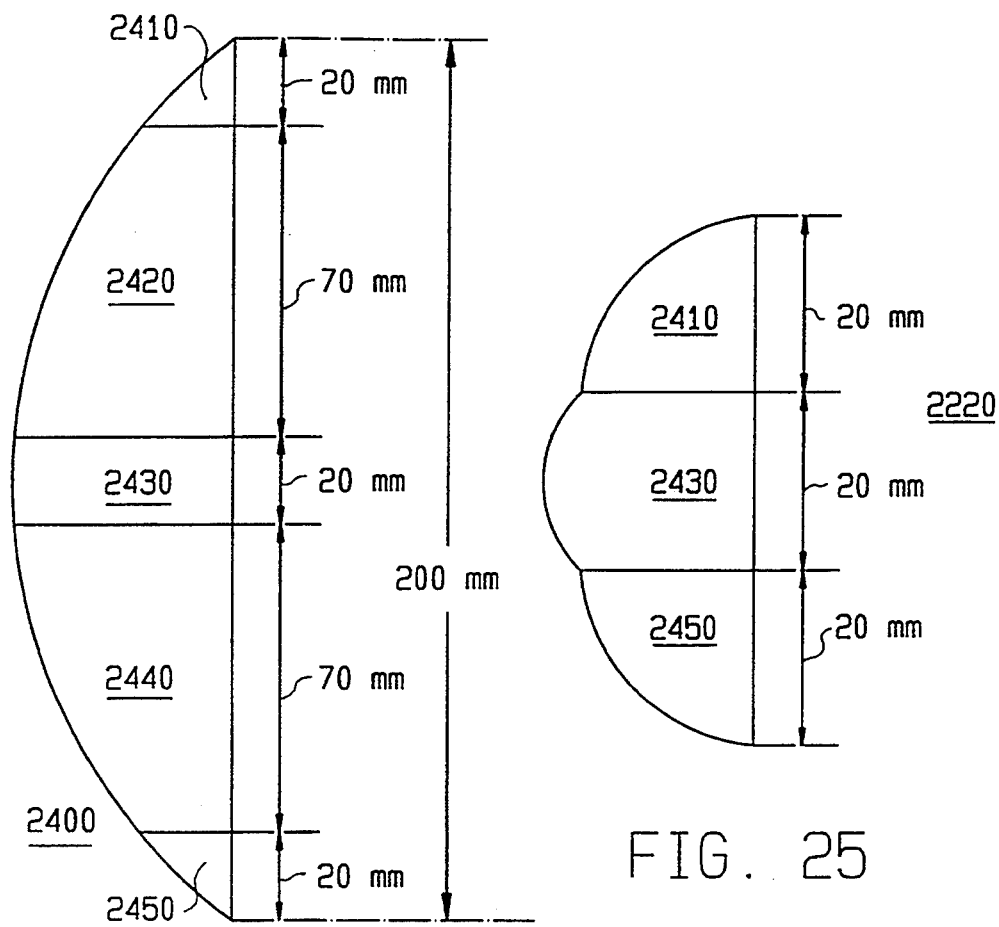
FIG. 24
FIG. 25
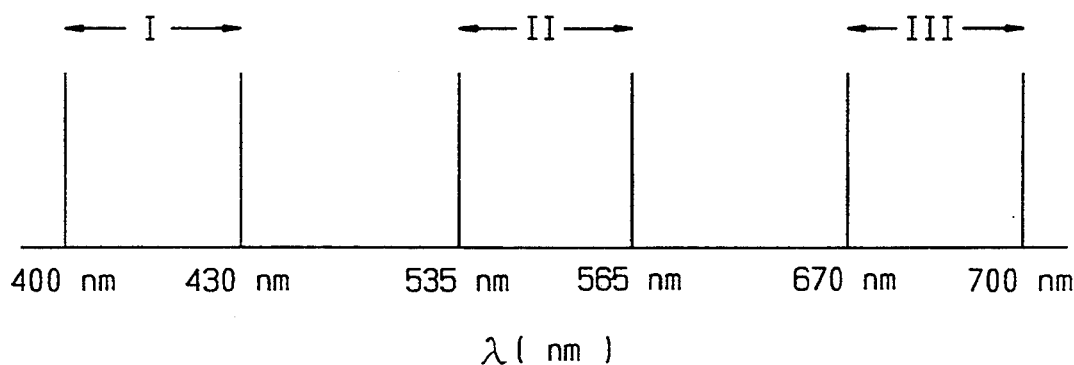
FIG. 26

MULTI-WAVELENGTH TUNABLE LASER

CROSS-REFERENCE TO RELATED APPLICATIONS

This application is a continuation-in-part of U.S. patent application Ser. No. 08/185,609, entitled "White Light Laser Technology" (Docket No. 4697-063), filed on Jan. 24, 1994, now pending in Group 2500, which is a continuation-in-part of U.S. patent application Ser. No. 08/180,401 entitled "Controlled Spectrum Generation Laser" filed Jan. 11, 1994, now U.S. Pat. No. 5,418,804; Ser. No. 08/180,408 entitled "White Light Laser Technology" filed Jan. 11, 1994, now U.S. Pat. No. 5,418,803; and Ser. No. 08/180,407 entitled "A Device For Pumping The Active Medium Of A White Light Laser" filed Jan. 11, 1994, now U.S. Pat. No. 5,418,805 each of which was filed on Jan. 11, 1994. Each of the above-identified applications, which are commonly assigned, is incorporated herein by reference.

TECHNICAL FIELD

This invention relates to lasers, and more particularly to lasers having a polychromatic spectrum or "white light" spectrum.

BACKGROUND OF THE INVENTION

Although conventional lasers emitting coherent radiation at a single wavelength have become indispensable research tools, for many applications there is still a need for a laser emitting simultaneously at a plurality of predetermined wavelengths or with a predetermined spectral composition. The realization of a polychromatic or white light laser provides novel approaches in numerous fields such as medicine, spectroscopy, holography, photo-chemistry, isotope separation, spectrum analysis, optical measurement, and/or ultra-short light pulse generation. In medicine, for example, white light lasers may be used to irradiate human organs with radiation whose spectrum is optimal with respect to the absorption characteristics of the organ under treatment. Accordingly, the development of polychromatic or white light lasers is of a particular interest to the scientific community. See also, for example, "White Light Laser," *Applied Optics*, Vol. 9, No. 5, p. 1209 (1970).

With respect to polychromatic or white light lasers, selected documents as discussed below are of interest.

U.S. Pat. No. 3,928,817 discloses a laser resonator for achieving forced oscillation at multiple wavelengths. Multiple-selected line operation is achieved with diffraction gratings and mirrors forming an independent three-element cavity for each desired wavelength. Oriented at the appropriate angle, the diffraction gratings allow regenerative amplification for the vibrational levels of the active medium disposed within the cavity.

U.S. Pat. No. 4,298,486 discloses laser resonator cavities comprising at least one active medium disposed in an optical cavity. A pair of similar intracavity spectral dispersion means allow radiation of different wavelengths to be regeneratively amplified in co-parallel regions of the active medium. Moreover, apertures within the cavity are positioned to transmit and block selected radiation wavelengths to produce forced oscillation at more than one wavelength.

U.S. Pat. No. 4,759,026 discloses a dye laser capable of lasing simultaneously at a plurality of wavelengths. A plurality of transparent containers transversely staggered are positioned between a partially-reflecting mirror and an adjustable retro-reflecting diffraction grating. The containers enclosing three separate dye solutions are pumped to generate spontaneous emission from each of the dye solutions. With the diffraction grating operating in three different diffraction orders, three parallel, but staggered cavities, are formed to effect lasing at three different wavelengths.

PCT application PCT/SU 89/00163 and Russian patent SU 1718313 disclose a white light laser comprising an active medium disposed within an optical cavity. The optical cavity comprises a diffraction grating operating in an auto-collimation mode, a pair of achromatic lenses positioned on opposite sides of the active medium, and a mirror. The diffraction grating and mirror form the ends of the optical cavity. Through the use of optical waveguides, the active medium is pumped along discrete portions. Spontaneous radiation emitted by the active medium propagates through one of the achromatic lenses and is then incident on the diffraction grating as collimated beams of varying angles of incidence. In accordance with the diffraction grating equation, for each collimated beam, only one wavelength component is diffracted back along the propagation direction onto the corresponding pumped portion of the active medium. Subsequently, the back reflected radiation is amplified by the active medium and then focused by the second achromatic lens onto the mirror. With the mirror reflecting the amplified radiation back through the active medium, simultaneous lasing is achieved for different discrete wavelengths.

Although the above polychromatic or white light lasers perform acceptably, the optical cavity structures are somewhat complex and large. Moreover, the overall performance, such as the spectral linewidth, intracavity loss, and optical efficiency, is limited and critically dependent on the complexity of the cavity structure.

It is therefore desirable to develop polychromatic or white light lasers not only having a simple cavity structure, but also having an enhanced and controllable spectrum.

SUMMARY OF THE INVENTION

A laser capable of generating polychromatic or white light radiation is realized by employing a diffraction grating and reflecting element as the ends of a simple laser resonator cavity. The diffraction grating either solely or in combination with an intracavity lens is arranged such that each wavelength component of the white light radiation is amplified by a different portion of the active medium. Forced oscillation or positive feedback for each wavelength component is achieved by operating the diffraction grating in an auto-collimation configuration.

Advantageously, the simplicity of the optical cavity provides the benefits of having compatible means necessary to enhance the overall optical performance, including enhanced optical efficiency and control of the spectral characteristics of the polychromatic or white light radiation.

In preferred embodiments, a plane diffraction grating serves to effect the forced oscillation or positive feedback via one of its diffraction orders, with the wavelength components of the polychromatic or whim light radiation egressing from the optical cavity as co-linear beams or spatially separated beams along an axis perpendicular to the axis of propagation. In other embodiments, concave and variable spacing diffraction gratings may be used to ensure that each wavelength component is amplified by a different portion of the active medium, without the need for an intracavity lens.

In certain embodiments, the intracavity lens may have a variable focal length which serves to adjust the linewidth and bandwidth of the polychromatic or white light radiation. And, in yet other embodiments, the intracavity lens may include several segmented lens portions, each having a center of curvature offset from the axis of the optical cavity. Moreover, each segmented lens portion may have a different focal length. Such an intracavity lens provides a means for independently adjusting the linewidth of a desired wavelength component of the white light radiation and the spectral range over which that wavelength component may be tuned.

In other embodiments, a multi-sided prism may be used to control the spectral characteristics of the polychromatic or whim light radiation.

In still other embodiments, the active medium may include multi-dye cells which serve to provide tunable wavelength components over a wider band than that provided by a single dye. Prisms disposed between the active medium and the intracavity lens may be used to compensate for the inability of the cell boundary walls of the multi-dye cells to lase.

According to another aspect of the invention, polychromatic or white light radiation having a plurality of wavelength components, each separated spatially along an axis, may be united into one co-linear beam through the use of an external diffraction grating.

In certain embodiments, the active medium is a linear array of laser diodes. Moreover, the linear array of laser diodes can be fabricated in a hybrid optical integration form with a distributed bragg reflector as the dispersive element to effect wavelength selective positive feedback. N×1 couplers can further be used to couple the polychromatic or white light radiation into a single optical fiber or into a plurality of optical fibers, such as for use in telecommunication applications. Moreover, optical amplifiers can be used to individually amplify and/or modulate each spectral component of the polychromatic or white light radiation.

In some telecommunication applications, the spectral component(s) of the polychromatic radiation can be judiciously tuned, such as through feedback, to stabilize the desired transmission wavelength(s) of the optical telecommunication system.

According to another aspect of the invention, a flashlamp pumping based laser emitting polychromatic radiation can be realized by using lenses offset from the optical axis of the laser cavity along the dispersion axis of the diffraction grating.

In the embodiments mentioned, the polychromatic or white light radiation may be either discrete or continuous. Additionally, the intracavity lens, active medium and mirror may be integrated as a single element.

BRIEF DESCRIPTION OF THE DRAWINGS

A more complete understanding of the invention may be obtained by reading the following description in conjunction with the appended drawing in which like elements are labeled similarly and in which:

FIG. 24 is an illustration of a 500 mm plano-convex lens divided into five segmented portions;

FIG. 25 is an illustration of a segmented intracavity lens formed from three segmented portions of the plano-convex lens of FIG. 24;

FIG. 26 is a graph of the characteristic range of spectral tunability for a polychromatic or white light laser using the intracavity lens of FIG. 25;

DETAILED DESCRIPTION

The invention provides a polychromatic or white light laser that utilizes a spectral dispersive element and reflecting element as the ends of a simple laser resonator cavity. The dispersive element either solely or in combination with an intracavity lens functions to map spatially the spontaneous emission from the active medium into amplified radiation of a corresponding wavelength. Radiation, each of a unique wavelength, is selectively amplified within a distinct portion of the active medium and within a single optical cavity. More particularly, the dispersive element provides selective optical feedback for the desired wavelengths. Because each wavelength uniquely corresponds to the spatial location of a portion of the active medium, the desired wavelengths may be chosen by appropriately pumping the active medium.

Without any loss of generality or applicability for the principles of the present invention, in some embodiments the description is with respect only to the generation of either a discrete spectrum or a continuous radiation spectrum. It should, however, be understood that each embodiment is generally capable of generating both types, discrete or continuous, depending on the pump configuration.

Figure 1:
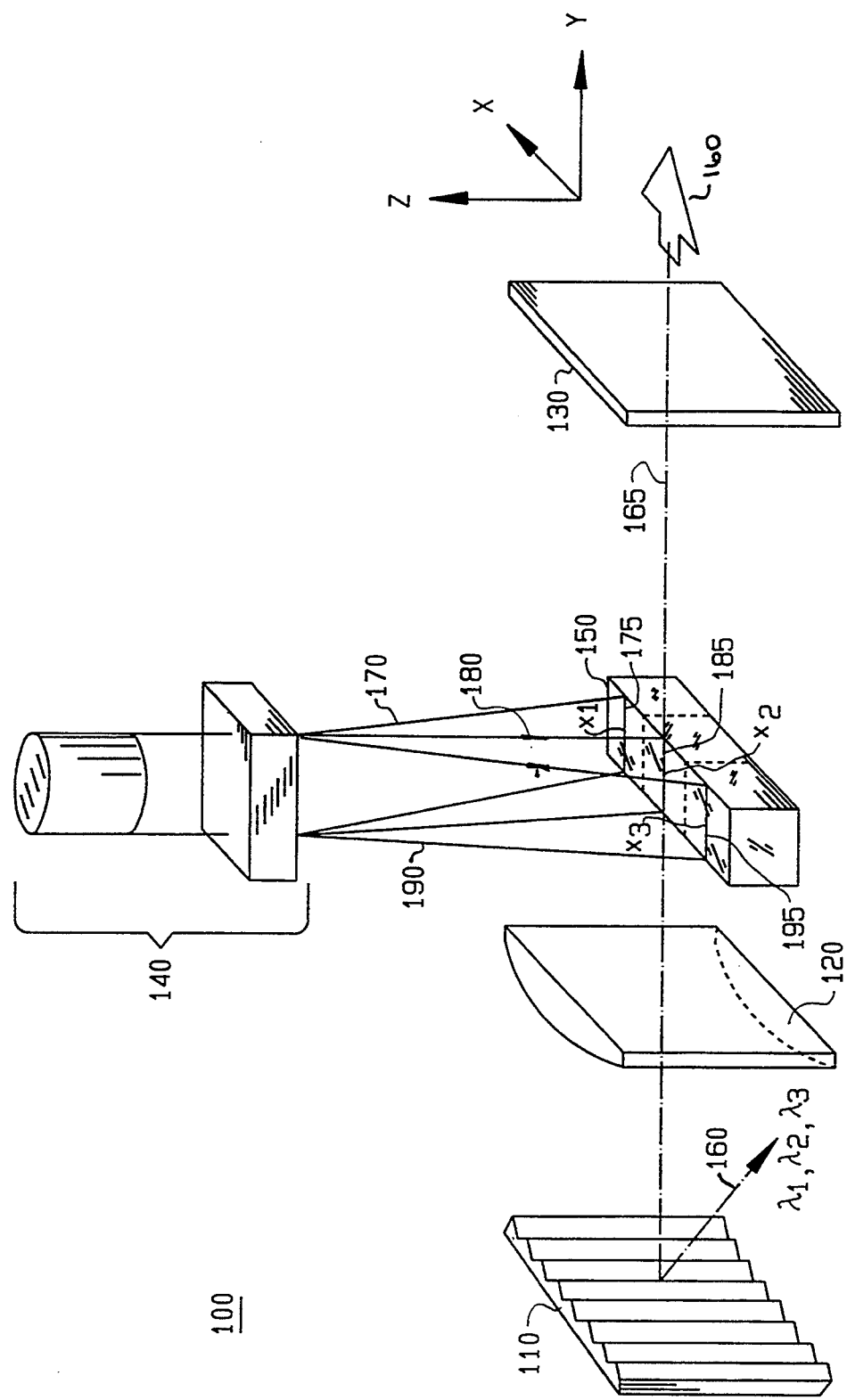
FIG. 1 is schematic of a first embodiment of a polychromatic or white light laser with independently tunable spectral components in accordance with the present invention.
Figure 2:
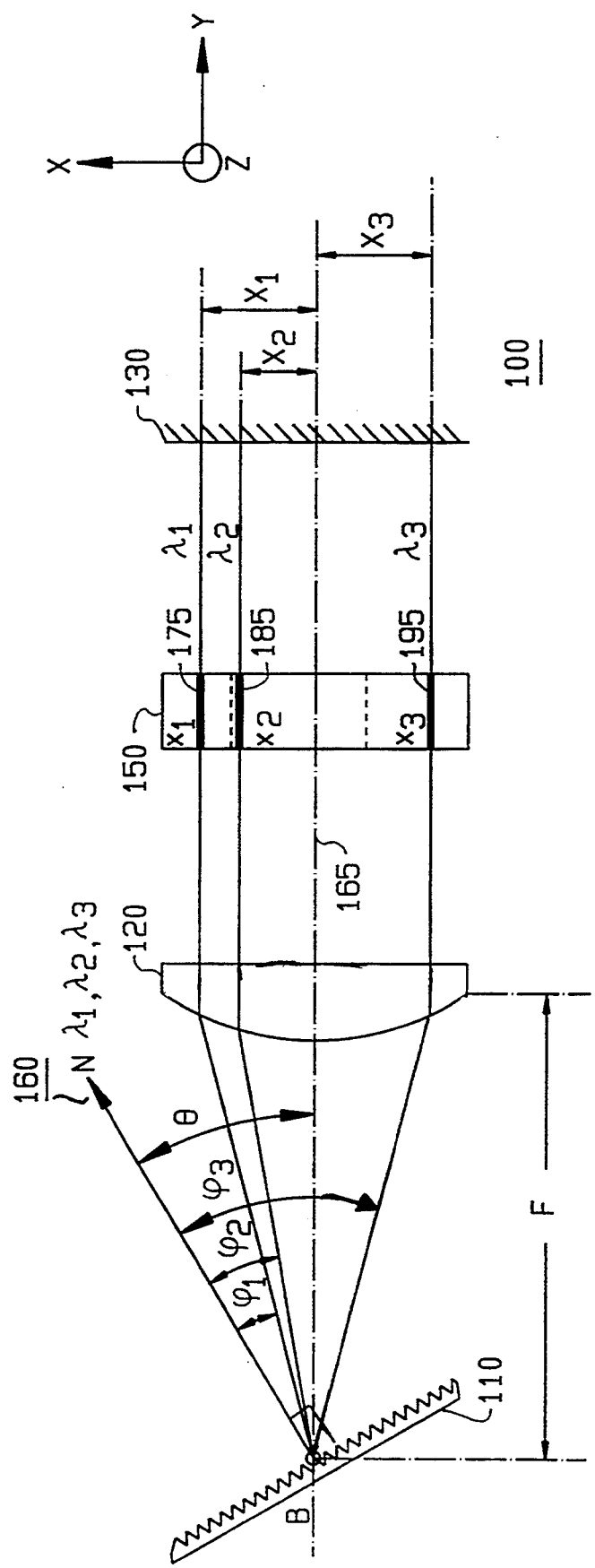
FIG. 2 is an elevation of the white light laser of FIG. 1 with the pump means omitted for clarity.

A first exemplary embodiment of a polychromatic or white light laser in accordance with the principles of the invention is schematically depicted in FIGS. 1 and 2. White light laser 100 comprises a diffraction grating 110, cylindrical lens 120, mirror 130, pump means 140 and active medium 150. Active medium 150 is disposed between lens 120 and mirror 130. Diffraction grating 110 is located a focal length, F, away from lens 120. Polychromatic or white light radiation 160 is provided through one of the diffraction orders of diffraction grating 110 in the form of a single beam of radiation wavelengths $\lambda_1$, $\mu_2$ and $\lambda_3$. Also, polychromatic or white light radiation 160 can be provided through mirror 130 in the form of co-parallel beams.

Pump means 140 produces beamlets 170, 180 and 190 which are focused simultaneously onto active medium portions 175, 185 and 195, respectively, so as to effect electron population inversion therein. Pump means 140 includes a pump laser, such an excimer, nitrogen, solid state, or copper-vapor laser. See, *Laser Guidebook*, by Jeff Hecht, McGraw Hill, New York (1992). More specifically, it is contemplated that beamlets 170, 180 and 190 may be generated from a single laser or from multiple lasers. In the case where a single laser is used, any well known optical beam splitter systems may be used to divide the single beam into the number of desired beamlets. Moreover, the single laser beam may be divided into several beamlets through the use of an acousto-optic deflector or a system of mirrors or prisms, as disclosed in our co-pending U.S. patent application, entitled "A Device For Pumping The Active Medium of A White Light Laser."

Figure 3:
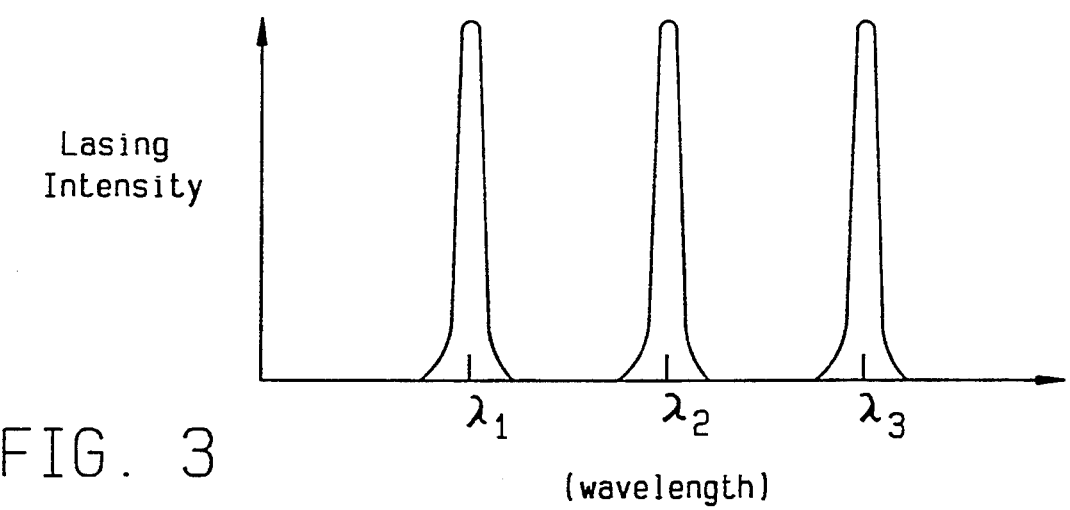
FIG. 3 is a graph of one illustrative lasing spectrum obtained with the polychromatic or white light laser of FIG. 1.

As discussed in more detail below, active medium portions 175, 185, 195 give rise to radiation at discrete wavelengths, $\lambda_1$, $\lambda_2$, and $\lambda_3$, respectively. For this first embodiment, an illustrative wavelength spectrum for white light radiation 160 is show in FIG. 3. Importantly, each of these spectral components can be independently tuned. Furthermore, it should be understood that the number of spectral components can be increased by simultaneously pumping other portions of the active medium.

Preferably, active medium 150 is any of the well known liquid dye solutions that are capable of broad spontaneous emission in the wavelengths of interest, namely $\lambda_1$, $\lambda_2$ and $\lambda_3$. For example, the dye solution may be in a polymer matrix or in a porous glass. See, *Laser Guidebook*, Jeff Hecht, McGraw-Hill, New York (1992). Also, solid state mediums with color centers, such as $LiF:F_2^+$, $LiF:F_2^-$, $LiF:F_3^+$ and $Al_2O_3:Ti_3^+$, can be used as the active medium.

Figure 4:
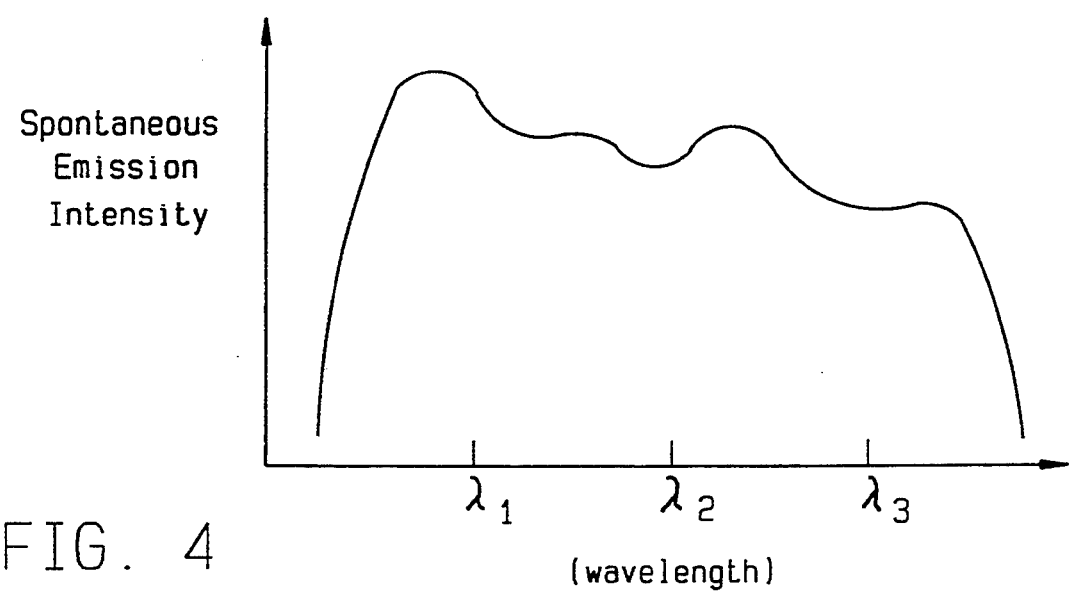
FIG. 4 is a characteristic graph showing the fluorescence spectrum of a dye solution.
Figure 5:
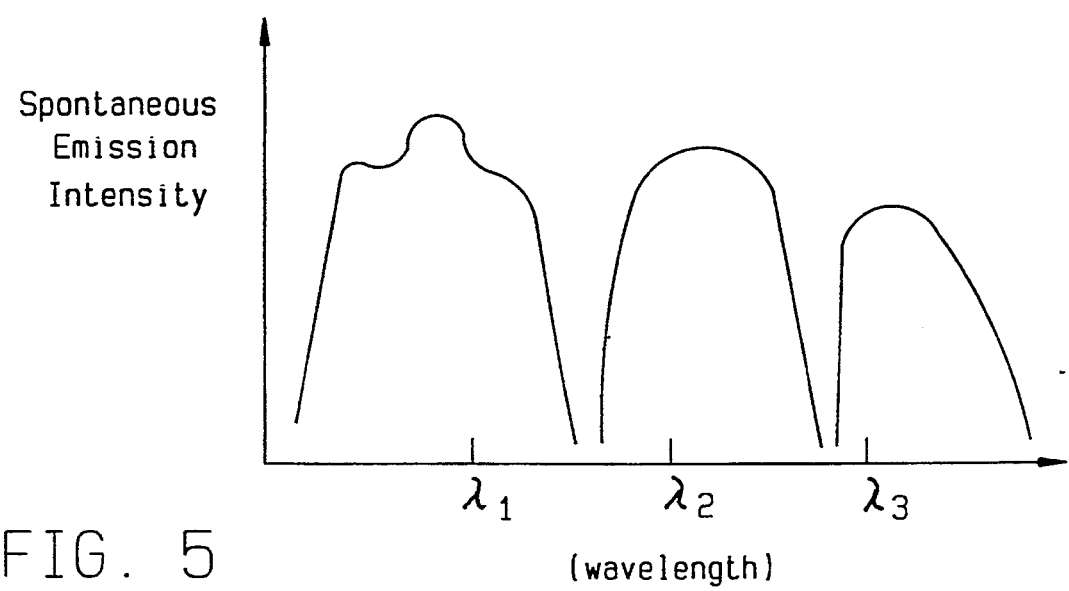
FIG. 5 is a characteristic graph showing the fluorescence spectra of multiple dye solutions.

The spontaneous emission spectrum of the active medium preferably has such characteristics as shown in FIG. 4. Moreover, active medium 150 may contain one or more adjacent dye cells, each containing the appropriate dye solution for a different wavelength spectrum of interest. The cell boundaries are shown by dashed lines in FIGS. 1 and 2. Typical emission spectra of a multicompartment dye cell are shown in FIG. 5.

Referring to FIG. 2, diffraction grating 110 is operated in a Littrow or auto-collimation configuration. That is, for radiation at a wavelength $\lambda$ and an angle of incidence $\phi$ between the radiation and the normal to the surface of diffraction grating 110, radiation is reflected back along the propagation axis of the incident radiation. Diffraction grating 110 is adjustably tiltable about an axis perpendicular to the propagation axis of white light radiation 160 to effect the Littrow or auto-collimation configuration.

For a Littrow or auto-collimation configuration, the relationship between the wavelength and the angle of incidence is given by:

$$\sin\phi = \frac{K\lambda}{2d} \quad (1)$$

where K is the diffraction order, and d is the period of the diffraction grating.

In operation, polychromatic or white light radiation is realized by simultaneously pumping active medium 150 at different portions, each portion located at a different distance from optical axis 165 along the dispersive axis of diffraction grating 110. Preferably, since the focal plane of the focusing lens typically used to direct the beamlets onto the active medium is not flat due to aberrations, a matching plate is also employed (not shown) for conforming the boundary interface of the active medium with the shape of the focal surface of the lens. For a detailed discussion on the operation of the matching plate, see applicants' co-pending U.S. patent application, entitled "Controlled Spectrum Generation Laser."

In general, spontaneous emission from each pumped portion of active medium 150 is directed onto diffraction grating 110. Diffraction grating 110 diffracts the broadband spectrum radiation into their component wavelengths, each component propagating at a unique angle, $\Psi$, which is dependent on its wavelength in accordance with the well known diffraction grating equation. See, *Principles of Optics* by Born and Wolf, Pergamon Press, New York (1975). For radiation incident on diffraction grating 110, only one wavelength component will be reflected back along the propagation direction of the incident radiation onto the corresponding pumped portion of active medium 150. This radiation is amplified and directed onto the surface of mirror 130. Mirror 130 redirects the radiation back through the optical cavity, resulting in lasing at a number of predetermined and independently tunable wavelengths.

In order to better understand the operation of white light laser 100, illustrative optical paths for intracavity radiation are depicted in FIG. 2. Consider radiation from active medium portions 175, 185 and 195 located distances $X_1$, $X_2$ and $X_3$, respectively, away from optical axis 165. Radiation from portions 175, 185 and 195 are co-incident on diffraction grating 110 at angles $\phi_1$, $\phi_2$ and $\phi_3$, respectively. In general, the angle of incidence is given by:

$$\phi = \theta - \tan^{-1}\left(\frac{X}{F}\right) \quad (2)$$

where X is the distance from the optical axis, F is the focal length of lens 120, and $\theta$ is the angle between the normal to the surface of diffraction grating 110 and optical axis 165.

For a Littrow or auto-collimation configuration, the wavelengths $\lambda_1$, $\lambda_2$ and $\lambda_3$ of the radiation diffracted back from portions 175, 185 and 195, respectively, are given by:

$$\lambda_1 = \frac{2d\sin\phi_1}{K_{fb}} \quad (3)$$

$$\lambda_2 = \frac{2d\sin\phi_2}{K_{fb}} \quad (4)$$

$$\lambda_3 = \frac{2d\sin\phi_3}{K_{fb}} \quad (5)$$

where $K_{fb}$ is the diffraction order of the optical feedback radiation. In general, subscripts 1-3 may be replaced by i to indicate the $i^{th}$ wavelength or spectral component. Thus, although spontaneous emission from each of portions 175, 185 and 195 is polychromatic, positive feedback within the cavity occurs only for radiation at the unique wavelengths $\lambda_1$, $\lambda_2$ and $\lambda_3$, respectively, given by equations 3-5.

Polychromatic or white light radiation 160 exists through one of the diffraction orders of diffraction grating 110 in accordance with the general diffraction grating equation:

$$\sin\Psi_i = \frac{K_{out}\lambda_i}{d} - \sin\phi_i \quad (6)$$

where $\Psi_i$ is the diffraction angle of the output radiation; $\lambda_i$ is the $i^{th}$ wavelength component of the output radiation; and $K_{out}$ is the diffraction order of the output radiation.

To ensure that each spectral component of white light radiation 160 egresses with the same angle of diffraction from diffraction grating 110 to form co-linear radiation 160, the angle of diffraction $\Psi_i$ of the diffracted radiation must be independent of wavelength. This can be achieved by setting $K_{out}\lambda_i/d$ equal to $\sin\phi_i$ so as to remove any dependency on wavelength. Now, substituting the general expression for $\sin\phi_i$ into equation (6) yields the relationship between the feedback diffraction order, $K_{fb}$, and the output diffraction order, $K_{out}$:

$$K_{out} = \frac{K_{fb}}{2} \quad (7)$$

It should be clear from equation (6) that each spectral component of white light radiation 160 is diffracted from diffraction grating 110 normal to the surface thereof because the sin of $\Psi_i$ equals zero.

Accordingly, to realize white light radiation 160 in the optical cavity depicted in FIGS. 1-2, the diffraction order for the feedback radiation must be chosen to be twice the diffraction order of the output diffraction radiation.

In accordance with equations 2–5, because the wavelengths of the spectral components of white light radiation 160 are dependent on the distance from the optical axis, the desired spectral components can be appropriately chosen by varying the spatial locations or coordinates of the pumped portions. This spectral dependency is given by:

$$\frac{dX}{d\lambda} = \left[ \frac{K}{2d\cos\phi} F\left(1 + \frac{X^2}{F^2}\right) + \frac{X}{F} \frac{dF}{d\lambda} \right] \quad (8)$$

For small angles $\phi$, this dependency is approximately linear.

Those skilled in the art will note that a basic feature of this white light laser is that it provides distinct regions, such as active medium portions 175, 185 and 195, where positive feedback at different wavelengths is spatially resolved and non-overlapping. The forced oscillation at different portions of the active medium substantially eliminates wavelength coupling effects arising from nonlinear effects, collisional coupling or transition homogeneous broadening. Advantageously, it should also be noted that for the optical cavity configuration of FIGS. 1–2 the optical path through the active medium for each wavelength is of equal path length.

Another advantage of the white light laser depicted in FIGS. 1–2 is that the intensity of each spectral component of the white light radiation can be easily adjusted for the desired application. The intensity of each pump beamlet associated with active medium portions 175, 185 and 195 may be adjusted by placing an active modulator, transmissive plate or partially reflective plate in the path between the pump beamlets and the active medium. Limiting the relative intensity of each pump beamlet, in turn, limits the intensity of each spectral component of the white light radiation.

It should be understood that the above equations regarding the conditions for forced oscillation or positive feedback are applicable for any portion on the active medium that is located a distance X away from the optical axis. As such, it should be clear that it is possible to pump extended segments or a continuous extended segment of the active medium to achieve broadband lasing. For example, pumping different segments of active medium 150 rather than discrete portions gives rise to white light radiation comprising segments of a continuous spectrum.

Figure 6:
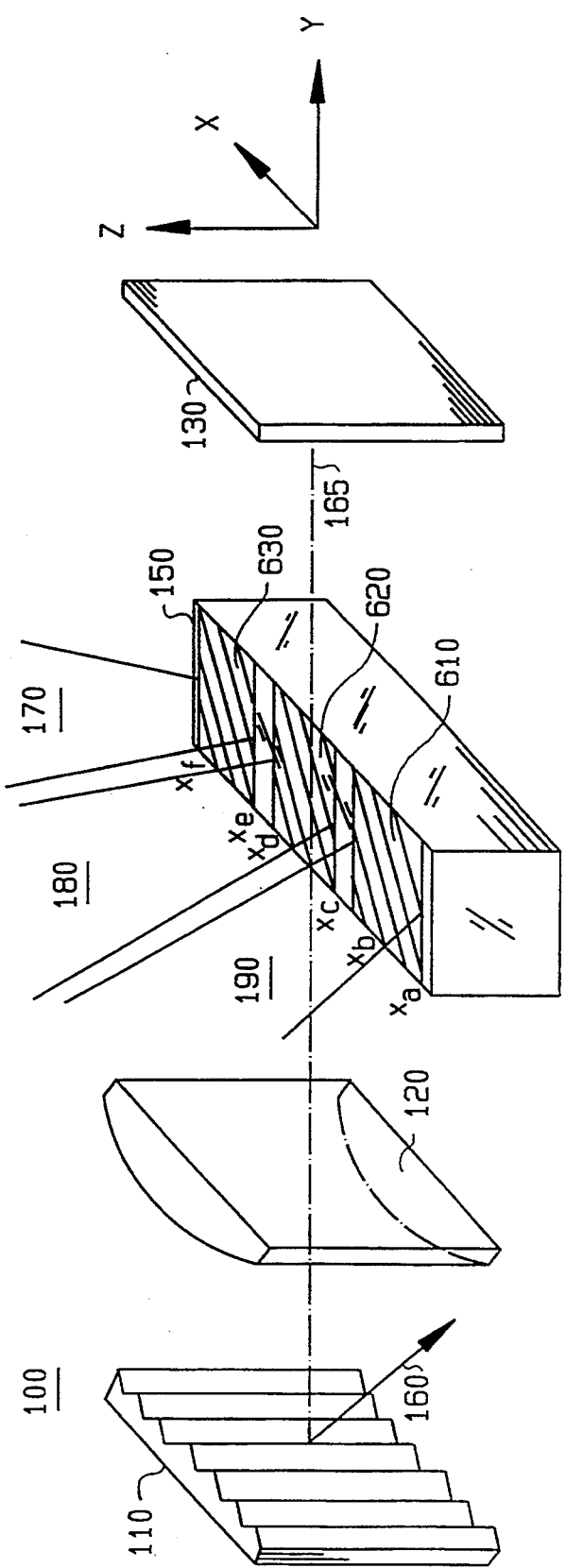
FIG. 6 is a schematic plan of the first embodiment of the polychromatic or white light laser having extended segments of the active medium pumped.
Figure 7:
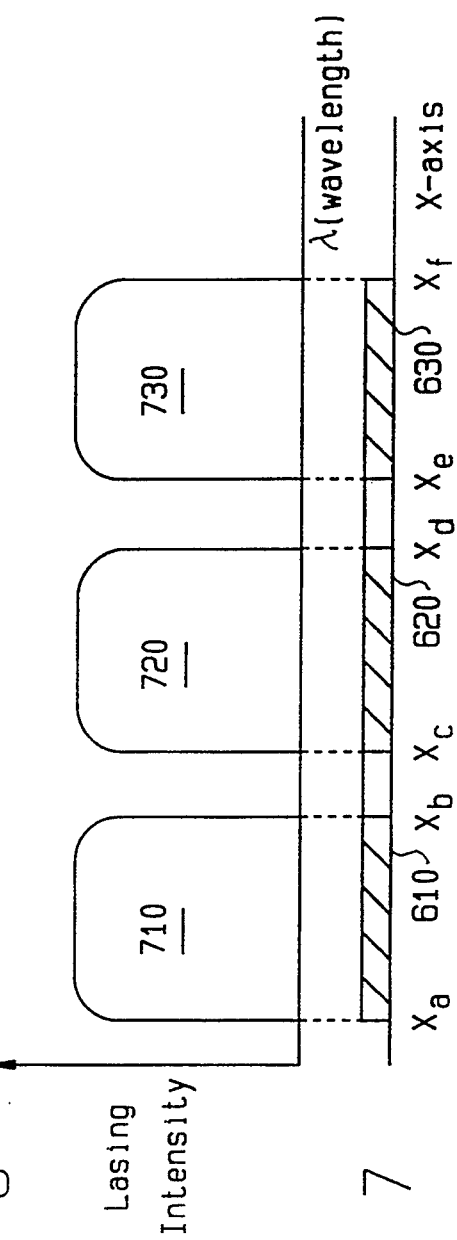
FIG. 7 is a graph showing the lasing spectrum of the polychromatic or white light laser of FIG. 6 when extended segments of the active medium are pumped.

Shown in FIG. 6 is active medium 150 being pumped at different segments 610, 620 and 630, with the characteristic lasing spectrum being illustrated in FIG. 7. Spectral segments 710, 720 and 730 correspond to the white light radiation generated from pump segments 610, 620 and 630, respectively, as noted by the X-axis placed underneath the horizontal wavelength axis of the lasing spectrum.

Figure 8:
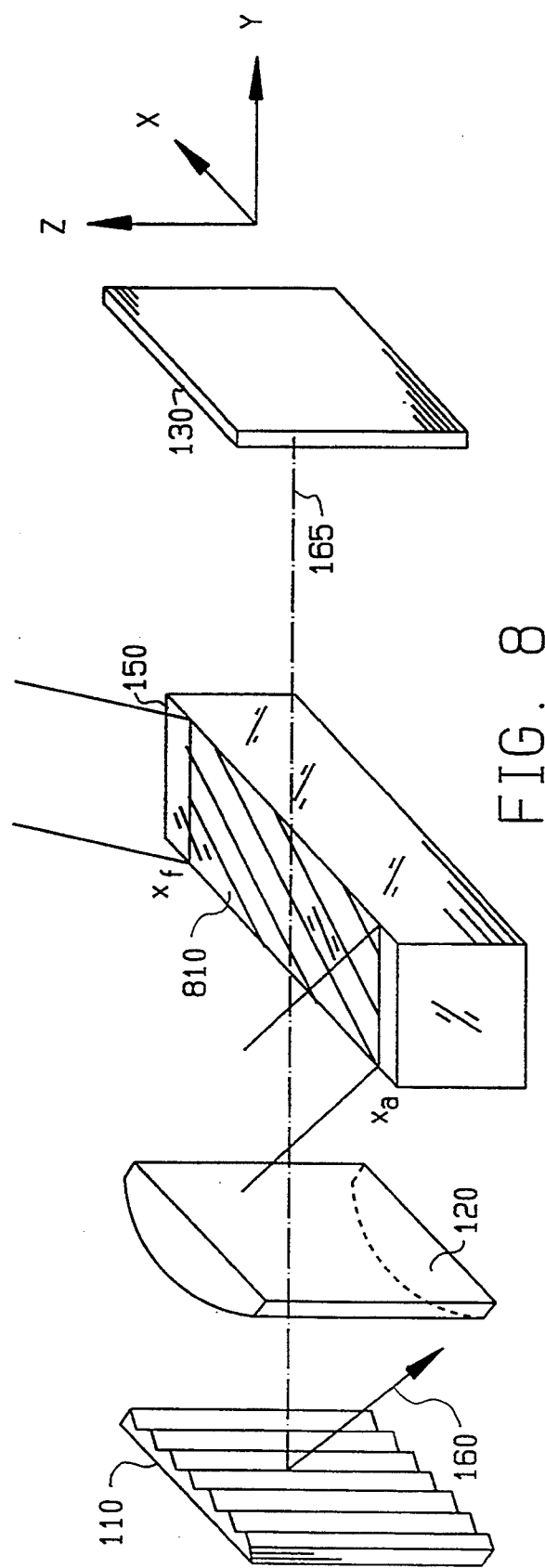
FIG. 8 is a schematic plan view of the first embodiment of the polychromatic or white light laser having a continuous extended segment of the active medium pumped.
Figure 9:
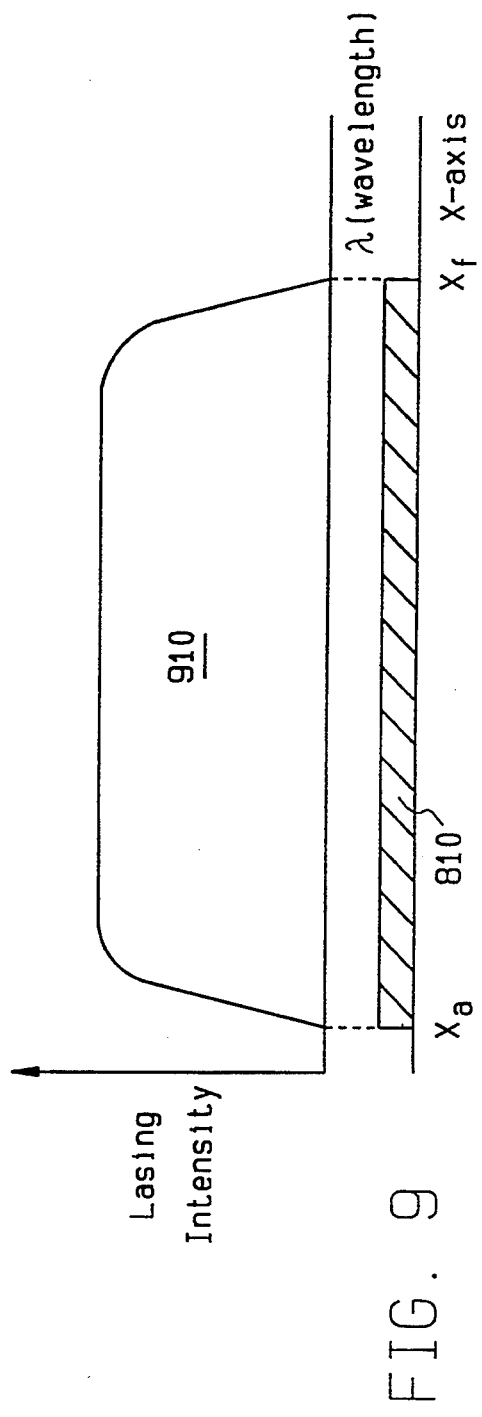
FIG. 9 is a graph showing the lasing spectrum of the polychromatic or white light laser of FIG. 8 when a continuous extended segment of the active medium is pumped.

Now referring to FIG. 8, there active medium 150 is illustrated as being pumped along a continuous portion 810, giving rise to white light radiation of a continuous spectrum 910. For this pump configuration, the characteristic lasing spectrum is illustrated in FIG. 9.

Figure 10:
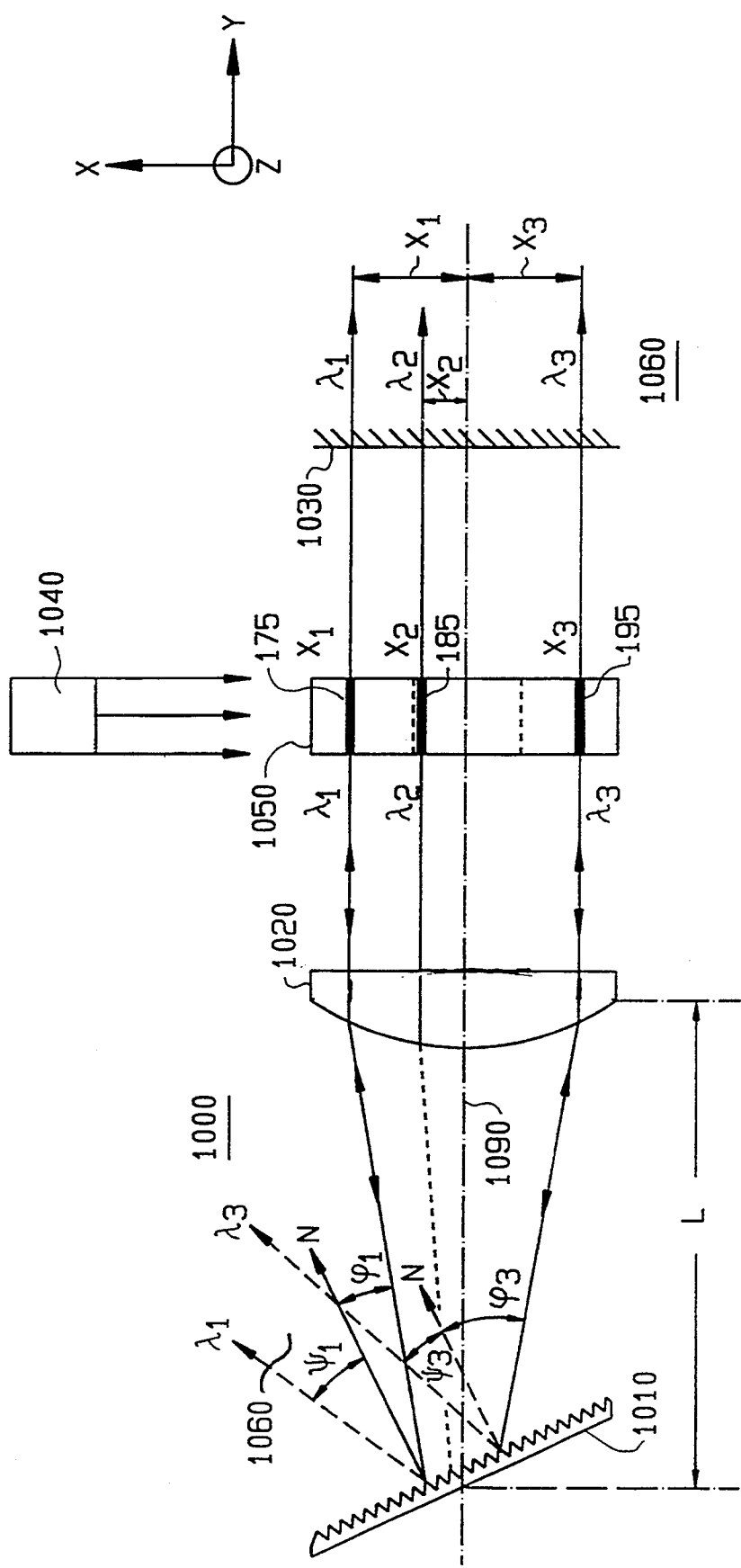
FIG. 10 is a schematic plan of a second embodiment of a polychromatic or white light laser in accordance with present invention.
Figure 11:
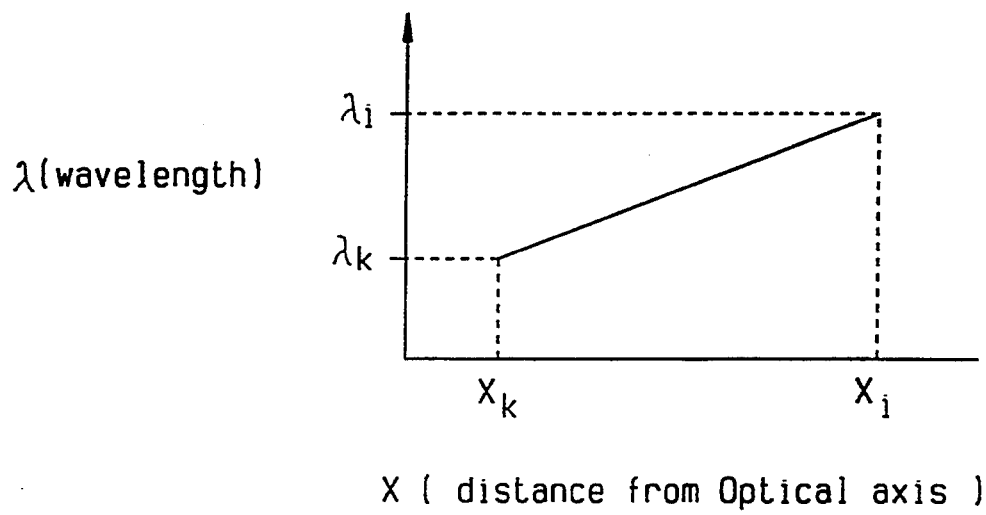
FIG. 11 is a graph of the relationship between the lasing wavelength and the spatial coordinate of the pumped portion of the active medium for the polychromatic or white light laser of FIG. 10.

Referring now to FIG. 10, there is illustrated a second embodiment of the present invention, in which the spectral components of white light radiation 1060 are extracted from the optical cavity in the form of spatially separated parallel beams. Similarly, white light laser 1000 comprises a diffraction grating 1010, cylindrical lens 1020, partially reflecting mirror 1030, pump means 1040 and active medium 1050. Active medium 1050 is disposed between lens 1020 and partially reflecting mirror 1030. Mirror 1030 may be either planar, convex or concave. White light radiation 1060 is either provided by way of mirror 1030 or by one of the diffraction orders of diffraction grating 1010, such as the first order, in the form of radiation having spatially separated spectral components. These spectral components may be tuned by adjusting the spatial coordinate, X, of the pumped portion of the active medium as illustrated in FIG. 11.

Pump means 1040 produces extended beamlets which are focused onto portions 175, 185 and 195 of active medium 1050 at spatial positions $X_1$, $X_2$ and $X_3$, respectively, to effect spontaneous emission along the entire width of the irradiated portions of active medium 1050. Diffraction grating 1010 is operated in an auto-collimation configuration. Now, consider radiation from a portion on active medium 1050 located the distance $X_3$ from optical axis 1090. Positive feedback or forced oscillation is only satisfied for radiation at a wavelength $\lambda_3$ given by:

$$\lambda_3 = \frac{2d\sin\phi_3}{K} \quad (9)$$

where K is the diffraction grating order, $\phi_3$ is the angle of incidence of the radiation on diffraction grating 1010, and d is the period of diffraction grating 1010.

Now consider radiation from a second portion on active medium 1050 located the distance $X_1$ from optical axis 1090. Similarly, positive feedback is only satisfied for radiation at a wavelength $\lambda_1$ given by:

$$\lambda_1 = \frac{2d\sin\phi_1}{K} \quad (10)$$

where $\phi_1$ is the angle of incidence of radiation on diffraction grating 1010 from point $X_1$.

Consider now any other radiation from active medium 1050 located at an intermediate distance X ($X_3 < X < X_1$) from optical axis 1090 incident on diffraction grating 1010. It can be shown that the wavelength radiation that satisfies the resonant condition lies between $\lambda_3$ and $\lambda_1$. Because the angle of incidence $\phi$ on diffraction grating 1010 is linearly dependent for small angles on the spatial location, X, white light radiation 1060 comprises spatially separated radiation wavelengths that linearly vary from $\lambda_1$ to $\lambda_3$ with the spatial location of the pumped portion of active medium 1050.

Advantageously, the embodiment of FIG. 10 substantially eliminates wavelength coupling between different portions of the active medium because diffraction grating 1010 is not placed at the focal length of lens 1020. As such, mode competition between different lasing wavelengths is minimized.

An advantage of the white laser configuration depicted in FIG. 10 is that it provides the capability of controlling the spectrum of the white light radiation by adjusting the focal length of intracavity lens 1020. If $\lambda_1$ and $\lambda_2$ are the desired minimum and maximum radiation wavelengths desired within the white light radiation, then the angular separation $\Gamma_{12}$ between them is given by:

$$\Gamma_{12} = \int_{\lambda_1}^{\lambda_2} D_\phi d\lambda \qquad (11)$$

where $D_{100} = d_{100}/d\lambda$ is the angular dispersion of diffraction grating 1010. For the desired spectral range, $\lambda_1$ to $\lambda_2$, the focal length, F, of intracavity lens 1020 can be shown to be given by:

$$|F| \leq \frac{S - \sin\Gamma_{12}}{2(1 - \cos\Gamma_{12})} \qquad (12)$$

where S is the size of the smallest intracavity element along the direction of the axis of dispersion. Referring to FIG. 10, S is typically the length of the intracavity lens along the X-axis. Moreover, the distance $X_i$ from optical axis 1090 required to generate radiation at a wavelength $\lambda_i$ is given by:

$$X_i = F\tan\int_{\lambda_0}^{\lambda_i} D_\phi d\lambda \qquad (13)$$

$$\lambda_i = \lambda_o + \frac{X_i}{D_\phi F} \qquad (14)$$

where $\lambda_0$ is the radiation wavelength corresponding to the portion of active medium 1050 located on optical axis 1090.

Figure 12:
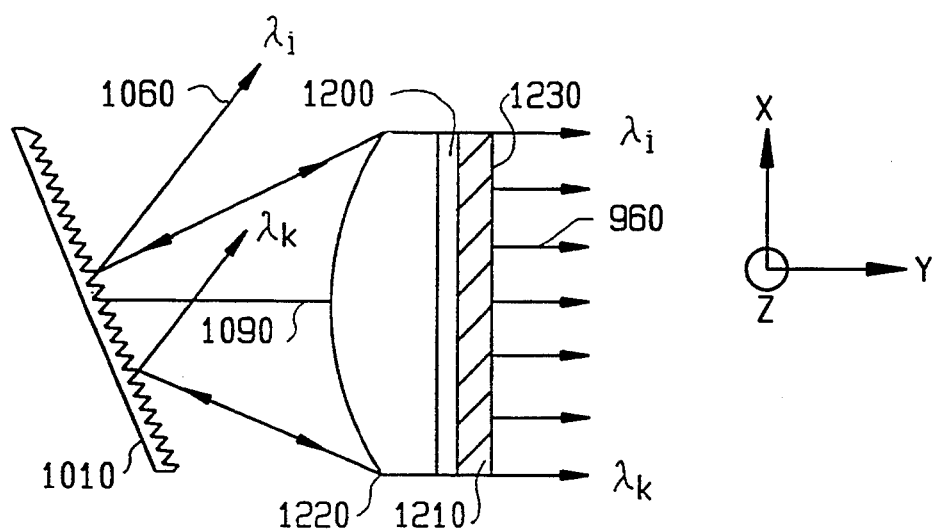
FIG. 12 is an illustration of the polychromatic or white light laser of FIG. 10 with the intracavity lens and mirror integrated with the active medium.

Although in the above embodiments the intracavity lens and mirror are located a distance away from the active medium, it is contemplated that the lens and/or the mirror may be integrated with the active medium, such as with a dye cell. For example, referring to FIG. 12, there is shown a dye cell 1200 fabricated with one lateral side made in the form of lens 1220, either cylindrical, concave or convex. The other lateral side of dye cell 1200 can be made in the form of a plate 1210 having a reflective coating 1230 disposed thereon to act as the mirror. By integrating the intracavity lens and mirror with the active medium, it is possible to simplify the construction of the optical cavity. Moreover, the intracavity loss is minimized because there are less surfaces from which reflections can occur.

Additionally, a diffraction grating having a variable blazing angle may be used in the above embodiments so as to increase the optical power output. In general, the reflectivity of a diffraction grating gradually decreases for wavelengths away from the wavelength for which the blazing angle has been optimized. This diminution while relatively minor for the first diffraction order is significant for the higher diffraction orders and greatly reduces the optical power output. By adjusting the blazing angle along the dispersive axis of the diffraction grating so as to be optimized for the wavelength of the feedback radiation associated therewith, it is possible to enhance the optical power output.

Preferably, a cylindrical lens should be employed when using a variable blazing angle diffraction grating because it is generally not necessary to change the incident angle of the radiation in the plane perpendicular to the axis of dispersion. Calculations indicate that the optical power output can increase between 20 to 300% with such a variable blazing angle diffraction grating.

Figure 13:
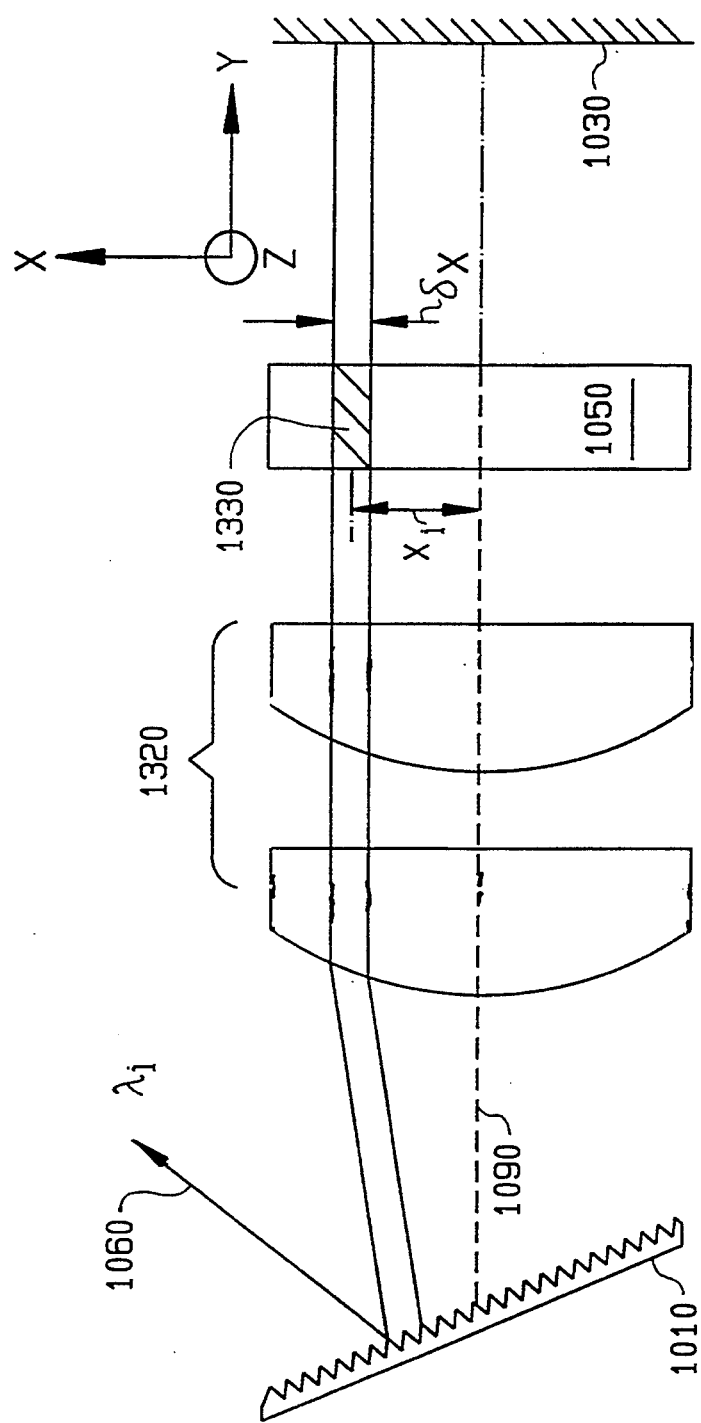
FIG. 13 is a schematic plan of a third embodiment of a polychromatic or white light laser with a variable focal length, intracavity lens.

Referring now to FIG. 13, there is illustrated a third embodiment of the present invention which is similar to the second embodiment and in which numeral 1320 denotes a variable focal length lens used to vary the linewidth of the spectral components or the bandwidth of white light radiation 1060. For the sake of clarity, only one spectral component is shown in FIG. 13. For a discussion on the design and operation of variable focal length lenses, see, for example, *Lens Design Fundamental*, Rudolf Kingslake, Academic Press, New York (1978). The lasing linewidth, $\delta\lambda$, for a discrete wavelength component can be shown to be given by:

$$\delta\lambda = D_\phi \frac{\delta X}{F\left(1 + \frac{X_i^2}{F^2}\right)} \qquad (15)$$

$$\lambda_i = \lambda_o + \frac{X_i}{D_\phi F} \qquad (16)$$

where $\delta X$ is the size of pumped portion 1330, F is the focal length of lens 1320, and $X_i$ is the distance of pumped portion 1330 from optical axis 1090.

In the white light laser constructed as shown in FIG. 13, it is possible to change the linewidth, $\delta\lambda$, without changing the size of the pumped portion of the active medium. Although the linewidth can be adjusted by varying the size of the pump beam incident on the active medium, the range is limited because the pump beam must still be sufficiently small so that the optical power density is high enough to effect lasing. Also, in some instances it is impractical to adjust the size of the pumped portion of the active medium because there is no mechanism to de-focus the pump beam. Accordingly, this third embodiment advantageously affords the ability to adjust the linewidth over a large spectral range without de-focusing the pump beam.

It is contemplated, however, that the linewidth can be adjusted also by simultaneously adjusting the size of the pumped portion of the active medium and the focal length of the intracavity lens. For example, results from experimental practice indicate that with an intracavity lens having a variable focal length between 30–500 mm, it is possible to vary greatly the linewidth of each spectral component of the polychromatic or white light radiation.

Figure 14:
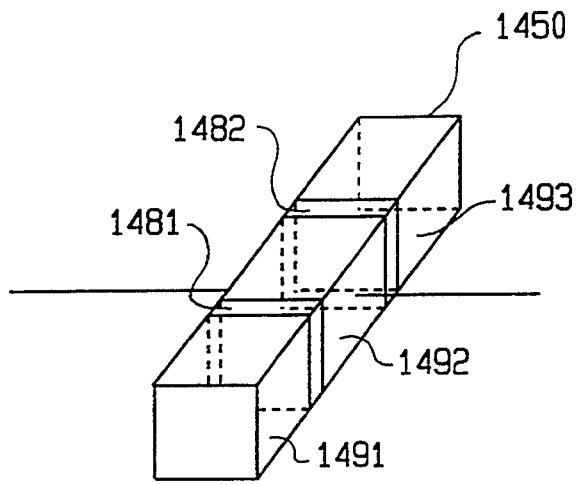
FIG. 14 is an illustration of a dye cell containing multiple cell compartments.

In the above embodiments, the desired wavelengths of interest are preferably covered by the fluorescence band of a particular dye. For some applications, however, it is desirable to provide tunable wavelengths over a wider band than that of a single dye. In those applications, an active medium 1450 comprises multiple cell compartments 1491, 1492, and 1493 of separate dye solutions, as shown in FIG. 14. Each dye solution, however, in practice is separated from another by a cell wall of a finite thickness, such as walls 1481 and 1482. It should be recalled that each wavelength component is uniquely mapped to the spatial coordinates of the active medium. With multiple cell compartments, there will unfortunately be gaps in the lasing spectrum corresponding to the width of each cell wall.

Figure 15:
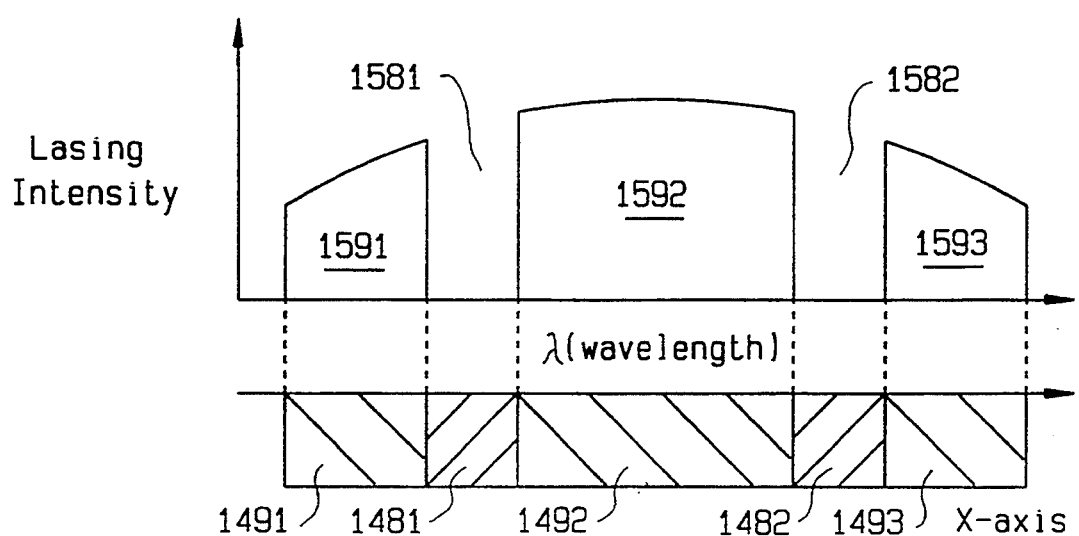
FIG. 15 is a graph of the characteristic spectrum of a polychromatic or white light laser having the dye cell of FIG. 14.

Shown in FIG. 15 is a characteristic spectrum of white light radiation generated from active medium 1450 comprising multiple cell compartments. Spectral gaps 1581 and 1582 correspond to the inability of cell boundary walls 1481 and 1482, respectively, to lase.

Figure 16:
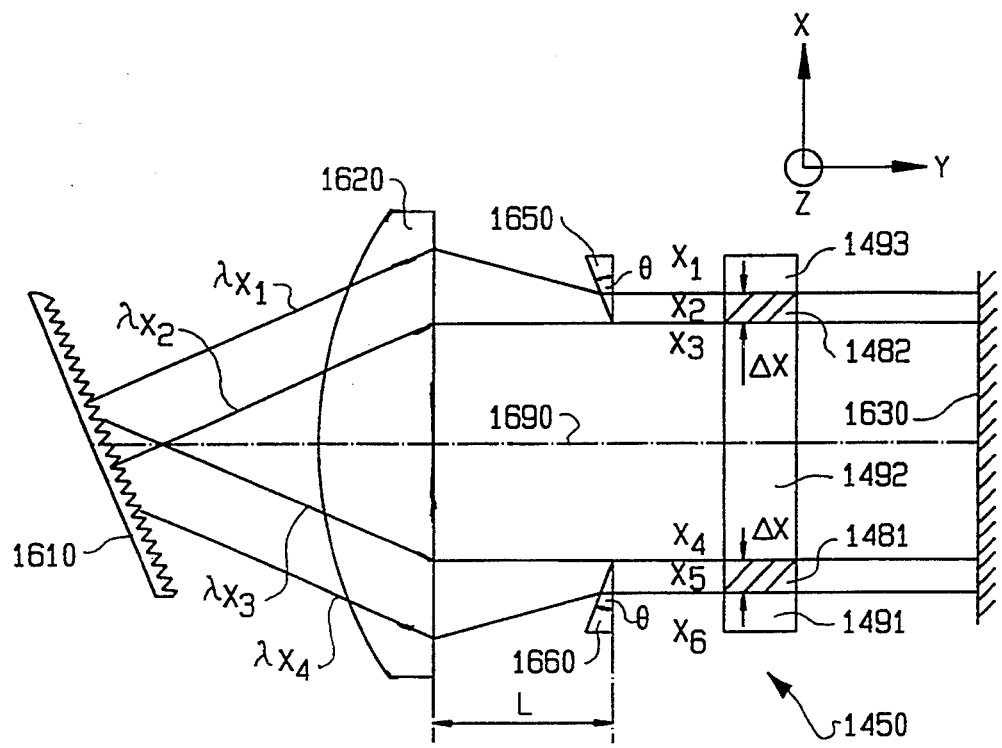
FIG. 16 a schematic plan of a fourth embodiment of a polychromatic or white light laser which utilizes a pair of prisms to compensate for the non-lasing portions of a multi-compartment dye cell.

Referring to FIG. 16, there is shown a fourth embodiment in which prisms are used to compensate for the non-lasing regions of active medium 1450, such as cell walls 1481 and 1482. Prisms 1650 and 1660 are disposed between active medium 1450 and intracavity lens 1020.

Importantly, prism 1650 is also positioned so as to refract radiation from portions of active medium 1450 located adjacent to edges $X_2$ and $X_3$ such that the radiation falls on diffraction grating 1610 with the same angle of incidence. Those skilled in the art will note that radiation from portions between $X_1$ to $X_2$ is also refracted along the X-axis by prism 1650 to shift the spectral range associated therewith. Similarly, prism 1660 is positioned in the same manner with respect to edges $X_4$ and $X_5$.

Figure 17:
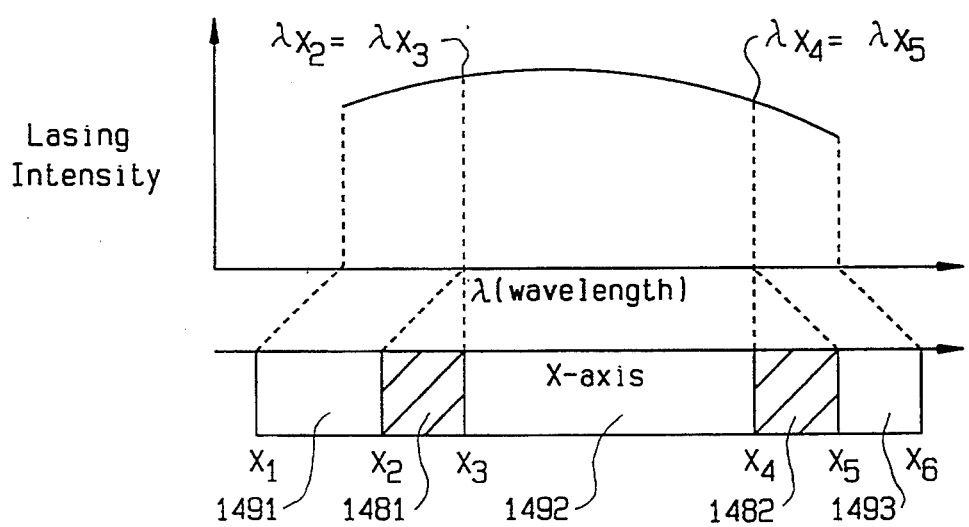
FIG. 17 is a graph of the characteristic spectrum of the polychromatic or white light laser of FIG. 16.

It should be recalled that the angle of incidence on the diffraction grating determines the wavelength of the feedback radiation and thus, the lasing wavelength of the corresponding spatial location of the active medium. Forcing the radiation from the edges of each cell wall to fall on the diffraction grating with the same incident angle ensures that the radiation wavelength corresponding to the edges of each cell wall is the same. As such, the lasing spectrum as well as the spectral range of tunability is continuous and without spectral gaps. Shown in FIG. 17 is the characteristic lasing spectrum of white light radiation generated from this fourth embodiment.

It can be shown from paraxial ray calculations that the prism angle $\theta$ required to properly refract the radiation from the edges of the cell wall in the manner described above is given by:

$$\theta = \frac{\Delta X}{(F - L)(N - 1)} \tag{17}$$

where $\Delta X$ is the width of the cell wall, F is the focal length of lens 1620, N is the index of refraction of the prism and L is the distance between the prism and lens 1620.

Figure 18:
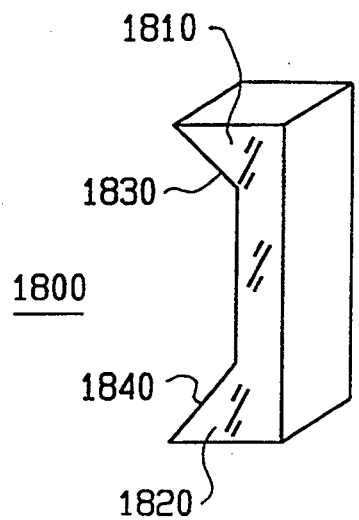
FIGS. 18 is an illustration of a compensatory plate having optical edges that function as prisms.
Figure 19:
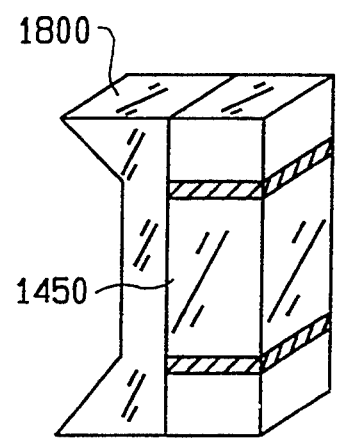
FIG. 19 is an illustration of the compensatory plate of FIG. 18 integrated with a multi-compartment dye cell.
Figure 20:
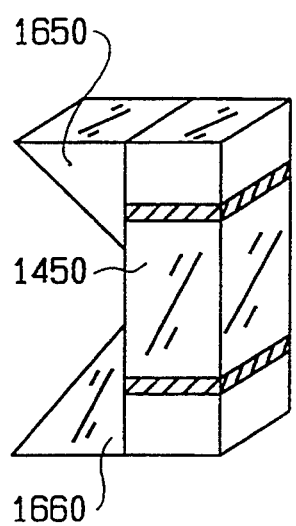
FIG. 20 is an illustration of the pair of prisms shown in FIG. 16 integrated with a multi-compartment dye cell.

It is to be understood that prisms 1650 and 1660 may also be fabricated as a single compensatory glass plate 1800, as shown in FIG. 18. The optical edges 1810 and 1820 of glass plate 1800 function as prisms, with the angle of each inclined surface 1830 and 1840 set in accordance with the width of the respective cell wall. Furthermore, it is contemplated that the prisms or compensatory glass plate may be advantageously integrated with the lateral side walls of the dye cell so as to obviate surface reflections, thereby increasing the optical efficiency of the cavity. FIGS. 19–20 illustrate exemplary integrations of the prisms and compensatory glass plate with the lateral walls of dye cell 1450, respectively.

Figure 21:
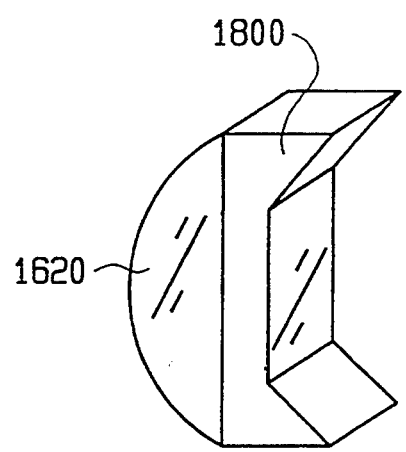
FIG. 21 is an illustration of the compensatory plate of FIG. 18 integrated with an intracavity lens.

Still further, compensatory plate 1800 may be fused or integrated with intracavity lens 1620 as illustrated in FIG. 21. Those skilled in the art will readily note that such an integration simplifies the optical alignment and increases the optical efficiency.

A specific embodiment which may be constructed to practice this fourth embodiment is now illustrated as follows. Diffraction grating 1610 is a holographic diffraction grating having a period of 1200 mm$^{-1}$; intracavity lens 1620 is a 150 mm cylindrical lens; and mirror 1630 is a dielectric mirror with a reflectivity of ~0.7 for the visible and near infra-red regions. Active medium 1450 consists of three adjacent dye cells, each separated by a 1 mm thick cell wall. Further, the first dye cell includes an ethanol solution of Rhodamine 6G and Oxazine 17; the second dye cell includes a solution of Coumarin 30; and the third dye cell includes a solution of Coumarin 47.

With this specific embodiment, each of the 1 mm thick cell walls corresponds to a 200 Å spectral gap in the lasing spectrum. In accordance with the principles of the invention discussed above, prisms each having an angle $\theta$ of 2.3° were positioned between the 150 mm lens and the active medium so as to eliminate the 200 Å spectral gaps, thereby forming a continuous lasing spectrum which ranged from the visible to the near infra-red.

In the above embodiments, it should be understood that the intracavity lens may either be a spherical, sphere-cylindrical, bi-focal, or cylindrical lens. In general, the focal length of the lens in the plane parallel to the dispersive axis of the diffraction grating is chosen in accordance with the desired lasing spectrum. The focal length or power of the intracavity lens in the plane perpendicular to the dispersive axis of the diffraction grating, however, may be chosen in accordance with the desired spatial field distribution, e.g., TEM$_{00}$, TEM$_{01}$, etc.

In some applications, such as in holography, it is desirable to independently adjust the linewidth and the tunable spectral range for each spectral component of the polychromatic or white light radiation. However, both the linewidth $\delta\lambda$ and the spectral range of tunability $\Delta\lambda$ are inversely proportional to the focal length of the intracavity lens as follows:

$$\delta\lambda = \frac{\delta x}{D_\phi F} \tag{18}$$

$$\Delta\lambda = \frac{\Delta X}{D_\phi F} \tag{19}$$

where $\delta x$ is the spot size of the pump beam on the active medium, and $\Delta X$ is width of the active medium along the dispersive axis of the diffraction grating.

Thus, if the focal length F is increased to decrease the linewidth $\delta\lambda$ of one desired spectral component, the spectral range $\Delta\lambda$ for all spectral components is also simultaneously decreased.

Figure 22:
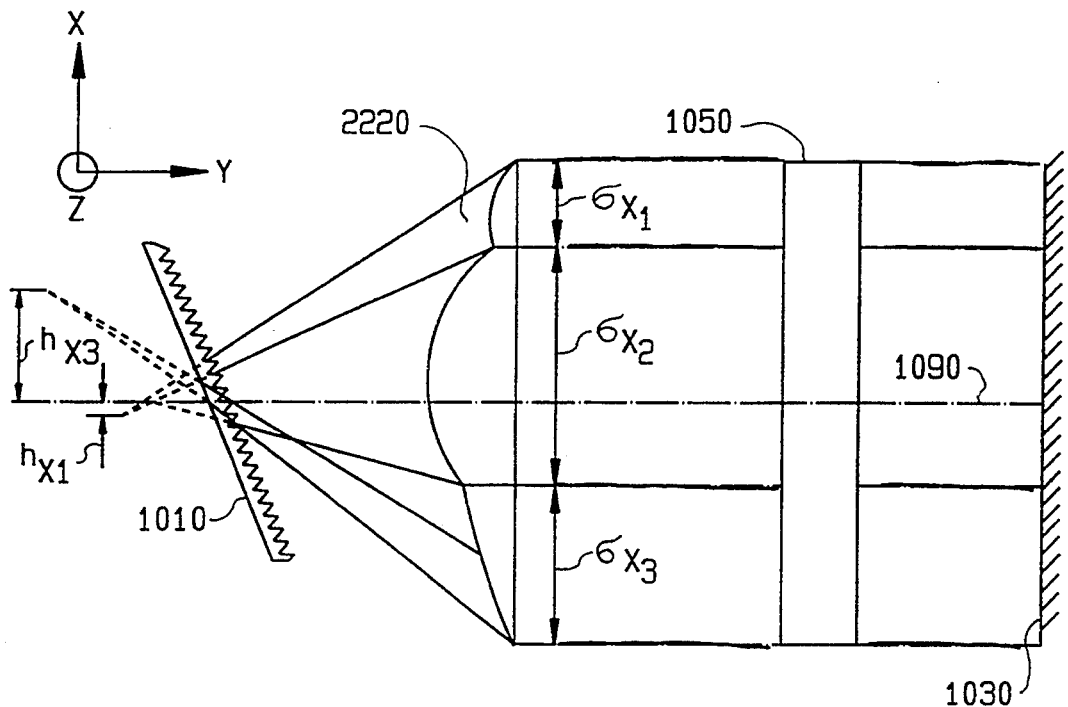
FIG. 22 is a schematic plan of a fifth embodiment of a polychromatic or white light laser with a multi-segmented intracavity lens.

Referring to FIG. 22, there is shown a fifth embodiment which is similar to that of FIG. 10 and in which element 2220 is a multi-segmented lens having portions $\sigma_{x1}$, $\sigma_{x2}$ and $\sigma_{x3}$. Lens portions $\sigma_{x1}$ and $\sigma_{x3}$ each has its center of curvature offset from optical axis 1090 along the dispersive axis of diffraction grating 1010. In this fifth embodiment, intracavity lens 2220 is advantageously used so as to allow the linewidth of one spectral component and the spectral range over which that spectral component is tunable to be adjusted independently of other spectral components. Each of lens portions $\sigma_{x1}$, $\sigma_{x2}$ and $\sigma_{x3}$ may have a different focal length depending on the desired linewidth. The width of each lens portions $\sigma_{x1}$, $\sigma_{x2}$ and $\sigma_{x3}$, moreover, is chosen in accordance with the desired spectral range $\Delta\lambda$ over which a desired spectral component is to be tuned. The width of each segment is given by $\Delta\lambda D_\phi F$.

It can be further shown that offsets $h_{x1}$ and $h_{x3}$ with respect to the focal points of lens portions $\sigma_{x1}$, and $\sigma_{x3}$, respectively, are dependent on the location of the center of curvature of the respective lens portion from optical axis 1090. This offset effectively shifts the tunable spectral range from each other and is given by the offset divided by $D_t$.

Figure 23:
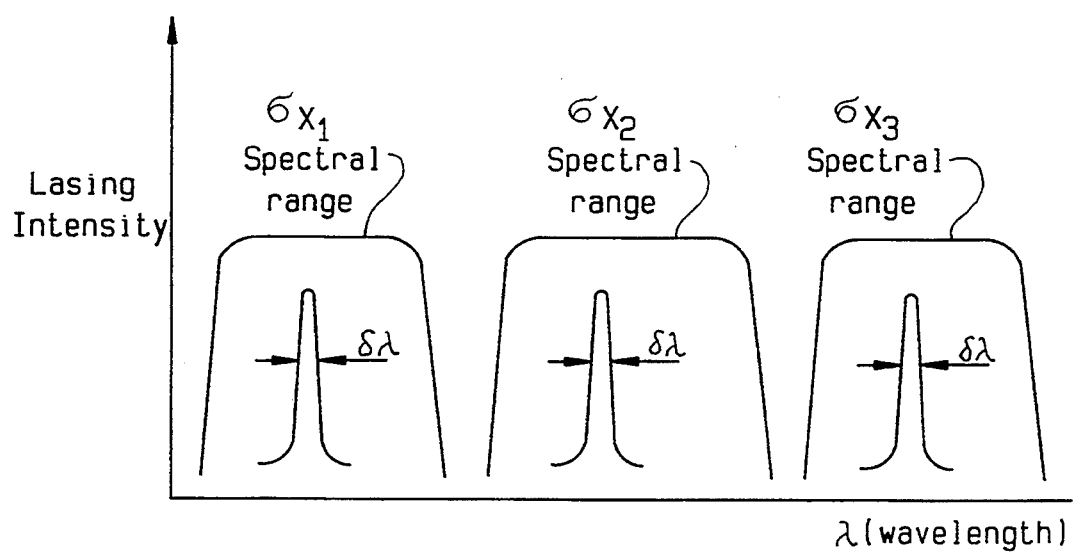
FIG. 23 is a graph of the characteristic spectrum of the polychromatic or white light laser of FIG. 22.

Shown in FIG. 23 is a characteristic lasing spectrum and range of spectral tunability for this fifth embodiment. It should be noted that for each lens portion, the linewidth and spectral range of tunability have been independently adjusted by appropriately choosing the focal length for each lens portion of intracavity lens 2200.

A specific embodiment which may be constructed to practice this fifth embodiment is now illustrated. Diffraction grating 1010 is a holographic diffraction grating having a period between 1200–2400 mm$^{-1}$; mirror 1030 is a dielectric mirror with a reflectivity of ~0.7 for the visible and near infra-red regions. Active medium 1050 consists of three adjacent dye cells, each containing a dye solution of, for example, an ethanol solution of Rhodamine 6G with Oxazine 17, Coumarin 153, and LD 425. Intracavity lens 2220 is made from portions 2410, 2430 and 2450 of a single 500 mm plano-convex cylindrical lens 2400 which has been divided into five portions, as shown in FIGS. 24 and 25.

With this specific embodiment, the linear dispersion $D_l$ is 0.66 mm per nm. Accordingly, each of the 20 mm length portions 2410, 2430 and 2450 has a corresponding spectral range of 30 nm over which a spectral component of the white light radiation can be tuned. Also, each tunable spectral range is offset from the other by 105 nm. This is because the center of curvature for lens 2410 and 2450 is each offset from the optical axis by 70 mm, which resulted from the removal of lens portions 2420 and 2440. Shown in FIG. 26 are the spectral ranges associated with each of portions 2410, 2430 and 2450. Note that regions I, II and III correspond to portions 2410, 2430 and 2450, respectively. It should be understood that within regions I, II, and III tuning may be accomplished by adjusting the location where the pump beamlets are incident on the active medium, i.e., the spatial coordinates of the pumped portion.

Figure 27:
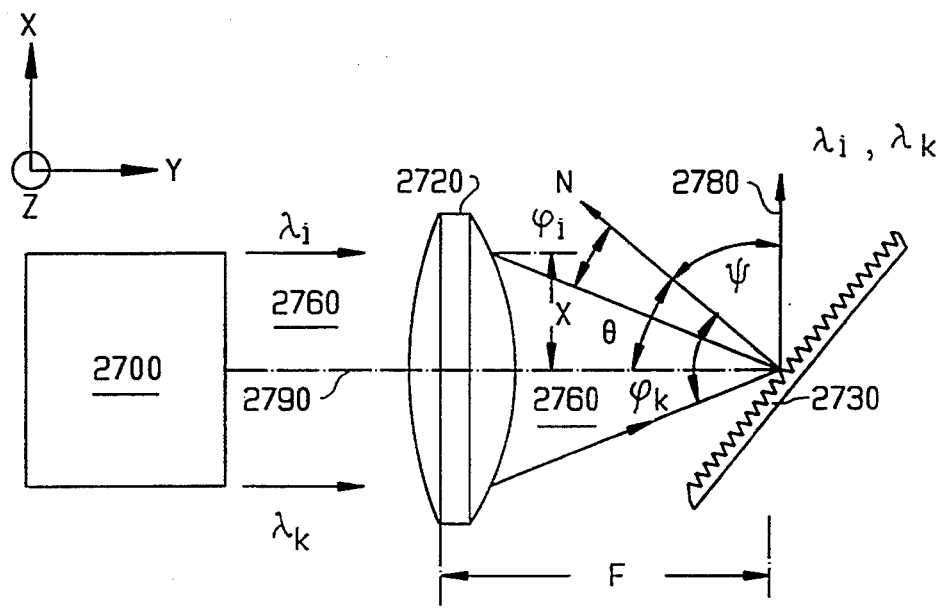
FIG. 27 is a schematic plan of a sixth embodiment of a polychromatic or white light laser in which an external dispersive element is used to generate colinear polychromatic or white light radiation.

One disadvantage posed by the cavity configurations of embodiments 2–5 lies in that the polychromatic or white light radiation egresses spatially separated in space. In a sixth embodiment, an external diffraction grating, however, can be employed advantageously to unite the wavelength components into a single colinear beam 2780, as shown in FIG. 27. According to this sixth embodiment, a polychromatic or white light laser 2700 similar to any one of embodiments 2–5 can be used. Notably, the spectral wavelength components of white light radiation 2760 are distributed along an axis perpendicular to the axis of propagation, as shown in FIG. 11. A lens 2720 is provided between white light laser 2700 and a diffraction grating 2730. Diffraction grating 2730 is placed a focal length, F, away from lens 2720.

White light radiation 2760 is diffracted by diffraction grating 2730 in accordance with the general diffraction equation:

$$\sin\phi + \sin\psi = \frac{K\lambda}{d} \quad (20)$$

where $\phi$ is the angle of incidence, $\Psi$ is the angle of diffraction with respect to the normal of the surface of the diffraction grating, and K is the diffraction order. To ensure that the diffracted radiation exits as co-linear radiation, we impose the restriction that $d\Psi/d\lambda$ is zero and calculate the angular dispersion, $D_\phi = d\phi/d\lambda$, by differentiating equation (20), treating $\phi$ and $\lambda$ as variables, to yield:

$$D_\phi = \frac{d\phi}{d\lambda} = \frac{K}{d\cos\phi} \quad (21)$$

Rearranging equation (21) we obtain that the linear dispersion is equal to:

$$D_l = D_\phi \cdot F = \frac{KF}{d\cos\phi} \quad (22)$$

where F is the focal length of lens 2720.

Accordingly, to unite the spectral components of the white light radiation into co-linear beam 2780, the focal length, F, of lens 2720 must be chosen such that the product of the angular dispersion, $D_\phi$ and the focal length, F, is equal to the linear dispersion, $D_l$ of the laser.

Figure 28:
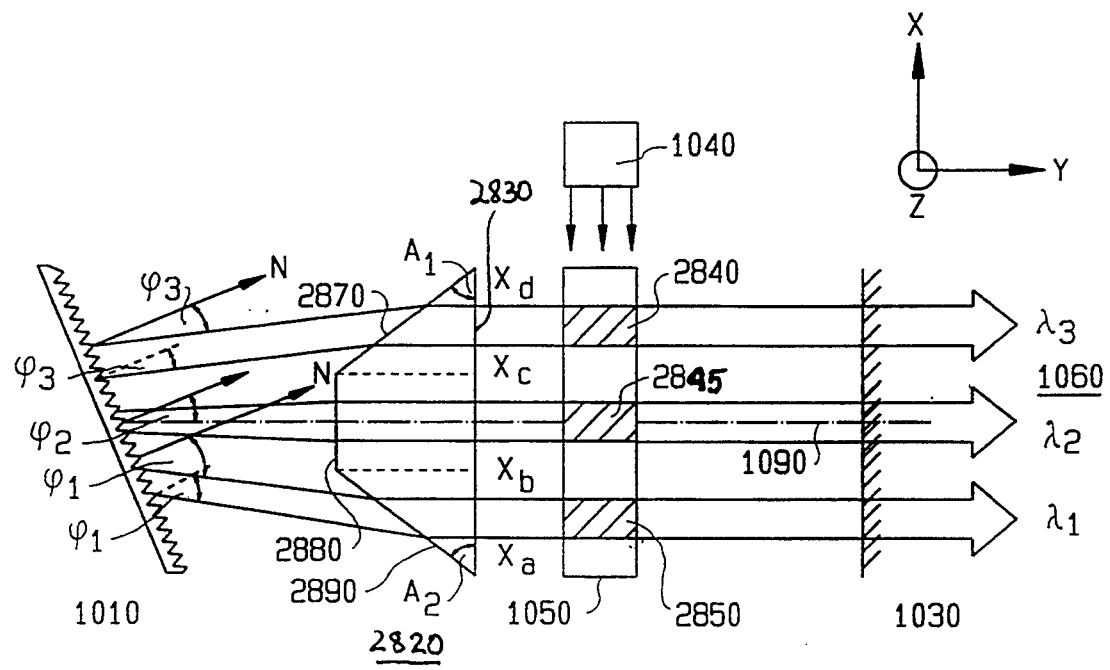
FIG. 28 is a schematic plan of a seventh embodiment of a polychromatic or white light laser having an intracavity, multi-sided prism.

Referring now to FIG. 28, there is illustrated a seventh embodiment similar to that of FIG. 10, except that numeral 2820 denotes a multi-sided prism. Also, pump means 1040 produces N distinct beamlets for pumping N respective portions of active medium 1050. The elements indicated by the same reference numerals as in FIG. 10 are of the same construction as in that figure.

Figure 29:
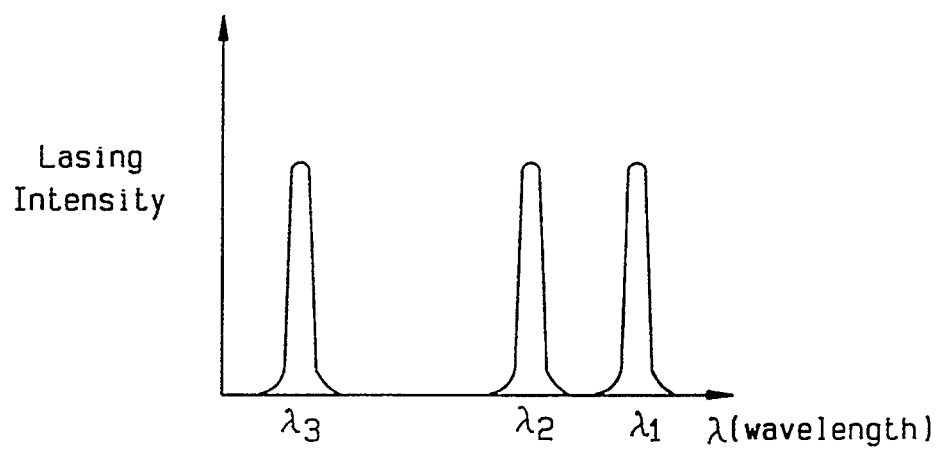
FIG. 29 is a graph of the characteristic spectrum of the polychromatic or white light laser of FIG. 28.

The number of spectral components or beamlets in polychromatic or white light radiation 1060 corresponds to the number of distinct portions of active medium 1050 pumped by pump means 1040 and positioned so as to allow radiation to propagate through the sides of prism 2820. In this seventh embodiment, the spontaneous emission from each pumped portion 2840, 2840 and 2850 of active medium 1050 is incident on one side of prism 2820, namely side 2870, 2880 or 2890. Although in the embodiment of FIG. 10, the radiation wavelengths were spatially dependent, in the present embodiment the desired wavelengths are selected by appropriately choosing the side angles $A_1$ and $A_2$ of prism 2820 with respect to a surface 2830. Note that the side angle of side 2880 is zero. With the correct side prism angle, the radiation is refracted and incident on diffraction grating 1010 at the appropriate auto-collimation or Littrow angle to effect positive feedback only for the desired wavelength of interest. Shown in FIG. 29 is the lasing spectrum of white light radiation 1060. The radiation wavelengths are independent of the spatial position of the pumped portion of the active medium within the regions associated with the sides of the prism, namely regions $X_a$-$X_b$, $X_b$-$X_c$ and $X_c$-$X_d$. It should be understood that each of these regions is associated with a desired wavelength.

For this seventh embodiment, the relationship between the side prism angle $A_i$ and the desired radiation wavelength $\lambda_i$ is given by:

$$A_i = \arcsin\left[\frac{\sin\Gamma_{io}}{\sqrt{n^2 + 2 - 2n\cos\Gamma_{io}}}\right] \quad (23)$$

$$\Gamma_{io} = \int_{\lambda_o}^{\lambda_i} D_\phi d\lambda \quad (24)$$

where n is the index of refraction of the prism, $D_\phi$ is the angular dispersion of diffraction grating 1010, and $\lambda_0$ is the radiation wavelength at the center of optical axis 1090.

Figure 30:
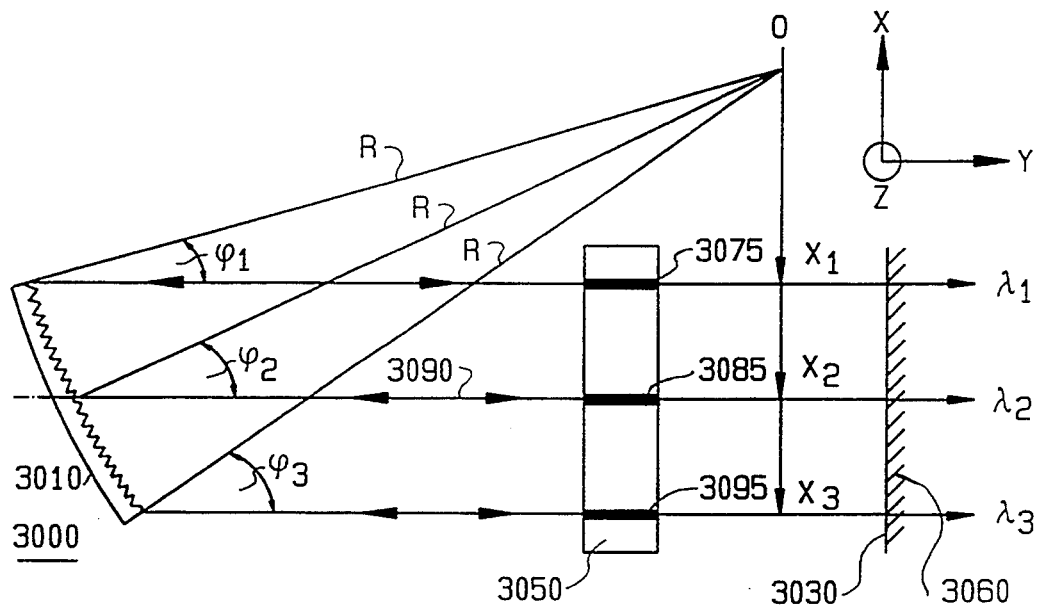
FIG. 30 is a schematic plan of an eighth embodiment of a polychromatic or white light laser with a concave diffraction grating.

Referring now to FIG. 30, there is illustrated an eighth embodiment of the present invention, which is different from embodiments 1–7 in that this embodiment does not employ an intracavity lens as a means to effect mapping the spatial coordinates of the active medium to a corresponding desired radiation wavelength.

White laser 3000 comprises pump means 3040 (not shown), active medium 3050, partially reflecting mirror 3030 and, in place of a planar diffraction grating, a concave diffraction 3010. Instead of using in combination the planar diffraction grating and intracavity lens, the concave diffraction grating is solely used to effect the mapping of the spatial location of the pumped portion of the active medium to a corresponding unique lasing wavelength, i.e., a "spatial-spectral" transformer.

For this eighth embodiment, white light radiation 3060 is similarly realized by simultaneously pumping active medium 3050 at different discrete portions 3075, 3085 and 3095. A plurality of pump beamlets irradiate portions 3075, 3085 and 3095, each portion located at a different distance, X, from optical axis 3090 along a direction parallel to the dispersive axis of diffraction grating 3010. Spontaneous emission from each pumped portion of active medium 3050 propagates toward partially reflective mirror 3030. Only radiation parallel with optical axis 3090 is reflected back toward the corresponding pumped portion. The reflected radiation re-enters the corresponding pumped portion of active medium 3050, is amplified therein, and then propagates as parallel radiation to concave diffraction grating 3010. Concave diffraction grating 3010 diffracts the broadband spectrum radiation characteristic of active medium 3050 into its spectral wavelength components. Each spectral wavelength component propagates at an angle dependent on its wavelength and on its angle of incidence with respect to diffraction grating 3010.

The governing mechanism for achieving lasing simultaneously at a plurality of desired wavelengths is described below. Point O denotes the center of curvature of concave diffraction grating 3010, with R being the radius of curvature. For any arbitrary point on active medium 3050, the distance from point O along a direction perpendicular to optical axis 3090 is X. Thus for portion 3075, the distance from the center of curvature 0 is $X_1$; for portion 3085, the distance is $X_2$; and for portion 3095, the distance is $X_3$. Amplified radiation from each of these portions ($X_1$, $X_2$ and $X_3$) is incident at angles $\phi_1$, $\phi_2$ and $\phi_3$, respectively, with respect to the normal of the surface of concave diffraction grating 3010. It can be shown that the incident angle $\phi$ for any point on the grating can be expressed generally as:

$$\sin\phi = \frac{X}{R} \qquad (25)$$

Concave diffraction grating 3010 is operated in an auto-collimation configuration, wherein the relationship between the wavelength $\lambda$ and the angle of incidence $\phi$ is given by equation (2). Accordingly, equating equations (2) and (25) yields:

$$\frac{X}{\lambda} = \frac{KR}{2d} \qquad (26)$$

According to equation (26), the radiation wavelength $\lambda$ that satisfies the condition for forced oscillation is linearly dependent on the distance X or the location of the pumped radiation on the active medium. That is, each spatial position of the active medium gives rise to radiation varying linearly with the distance form the optical axis. Noting that the spectral dispersion, $D_1$, is defined as $dX/d\lambda$, it can be further shown from equation (26) that the dispersion is given by a constant, namely $KR/2d$.

Unlike those embodiments which utilize an intracavity lens, the dispersion in this latter embodiment is independent of the angle of incidence. Accordingly, any non-linearaties or optical aberrations that are dependent on the angle of incidence, $\phi$, such as chromatic aberration, are eliminated.

Importantly, the use of a concave diffraction grating increases the optical efficiency of the white light laser. This is so because without the intracavity lens the optical loss as a result of surface reflections through the lens is obviated. Also, the concave diffraction grating can be blazed such that the optical feedback is effected through the lower diffraction orders where the efficiency is typically greater. Further, once the blazing angle is set for one wavelength, it will also be substantially set for all other wavelengths.

In one preferred embodiment, mirror 3060 is a dielectric mirror having a reflectivity of ~0.7 in the visible and near infra-red regions, and diffraction grating 3010 is a diffraction grating having a period of 1200 $mm^{-1}$, with a radius of curvature of 500 mm. Furthermore, active medium 3050 is a dye solution of Rhodamine 6G, Rhodamine B and Coumarin 47. Results from experimental practice indicate that with this specific embodiment simultaneous lasing is possible from the visible to the near infra-red spectral regions, with a spectral dispersion of approximately 0.303 mm/nm.

Further, it is anticipated that convex, cylindrical, bifocal, or sphere-cylindrical diffraction gratings may also be used to enhance the optical performance. For example, convex diffraction gratings can be used to increase the wavelength selectivity, while cylindrical or sphere-cylindrical diffraction gratings can be used to increase the lasing power. In accordance with the principles of the invention, however, the axis of dispersion is chosen to lie substantially perpendicular to the propagation direction of the pump beam.

For bifocal or sphere-cylindrical diffraction gratings, the radius of curvature perpendicular to the axis of dispersion is judiciously chosen to achieve a stable resonator. The radius of curvature, however, parallel to the dispersion axis may be chosen to effect the desired linewidth or spectral range of lasing.

Also, it is contemplated that the effective combination of a concave diffraction grating and mirror may be achieved by a planar diffraction grating and a concave, convex, spherical, cylindrical, or sphere-cylindrical mirror, in accordance with principles of the invention discussed above.

Figure 31:
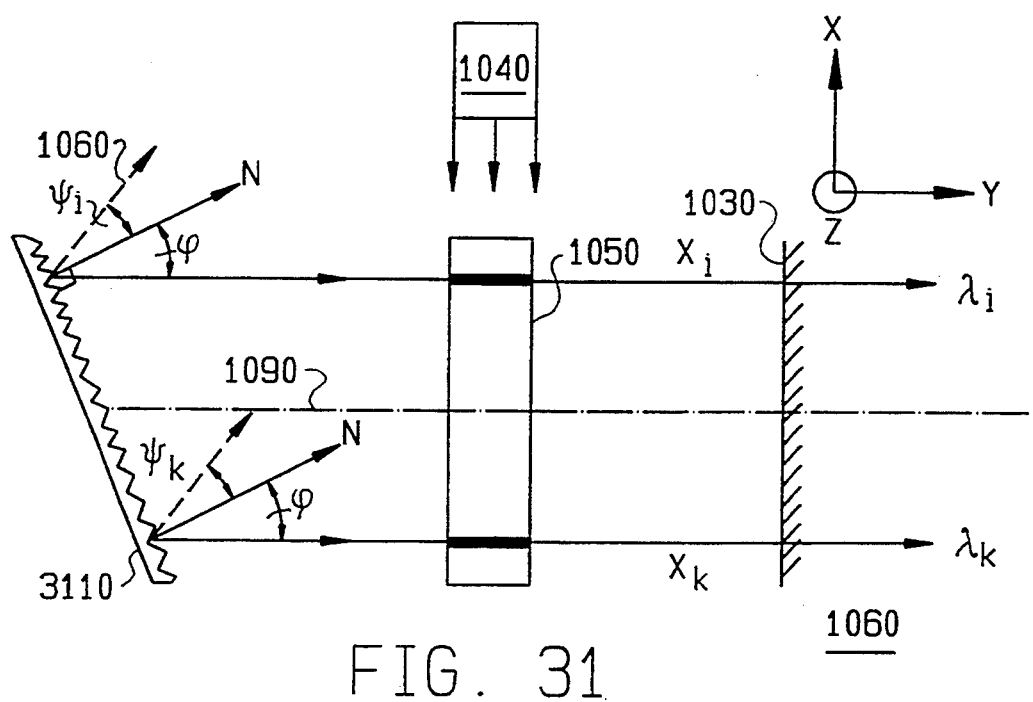
FIG. 31 is a schematic plan of a ninth embodiment of a polychromatic or white light laser having a planar diffraction grating with a variable spacing.

Referring now to FIG. 31, there is illustrated a ninth embodiment of the present invention, in which a planar diffraction grating 3110 is employed. Planar diffraction grating 3110 has a variable spacing or period, d(x), along the axis of dispersion, X. The elements indicated by the same reference numerals as in FIG. 10 are of the same construction as in that figure. Notably, however this ninth embodiment does not use an intracavity lens.

The operation of this ninth embodiment is substantially similar to that of the eighth embodiment. For diffraction grating 3110 operating in an auto-collimation configuration, positive feedback or forced oscillation is only satisfied for radiation having a wavelength $\lambda$ given by:

$$\lambda(X) = \frac{2d(X)\sin\phi}{K} \quad (27)$$

where d(X) is the period of the diffraction grating as a function of X, λ(X) is the wavelength as a function of X, K is the diffraction order, and φ is the angle of incidence. It should be noted that in this embodiment the angle of incidence is the same for each of the spectral components.

If equation (27) is differentiated with respect to X, we obtain:

$$\frac{d\lambda}{dX} = \frac{2\sin\phi}{K} \frac{d}{dX} d(X) \quad (28)$$

In accordance with equation (28), the generated wavelength λ therefore varies with the first order differential of the spacing d(X), given that φ and K are constants. If the spacing of the diffraction grating varies linearly along a direction perpendicular to the optical axis, then so does the generated radiation wavelength. Moreover, it should be obvious from equation (28) that the linewidth or bandwidth of the generated radiation is dependant also on the size of the pumped portion of the active medium along the direction of the dispersion axis.

Although FIG. 31 illustrates that the white light radiation is provided from mirror 1030, it may be preferable to extract the radiation through the zeroeth or first diffraction order of diffraction grating 3110 so as to maximize the optical efficiency.

Results from experimental practice indicate that for the appropriate portion of diffraction grating 3110 to effect positive feedback for radiation near the ultra-violet region (~0.3 μm), the spacing of the diffraction grating is preferably about 3600 mm$^{-1}$, whereas for radiation near the infra-red region (~0.9 μm) the spacing should be about 1200 mm$^{-1}$.

The utility of the above arrangement is that it provides for the feedback radiation to be based on the zeroeth or first diffraction order. Furthermore, this arrangement avoids the use of an intracavity lens for performing the spectral-spatial transformation. Hence, it can readily be shown that this arrangement reduces optical loss associated with reflections from the surfaces of the intracavity lens, which may be somewhat significant for off-axis radiation.

Figure 32:
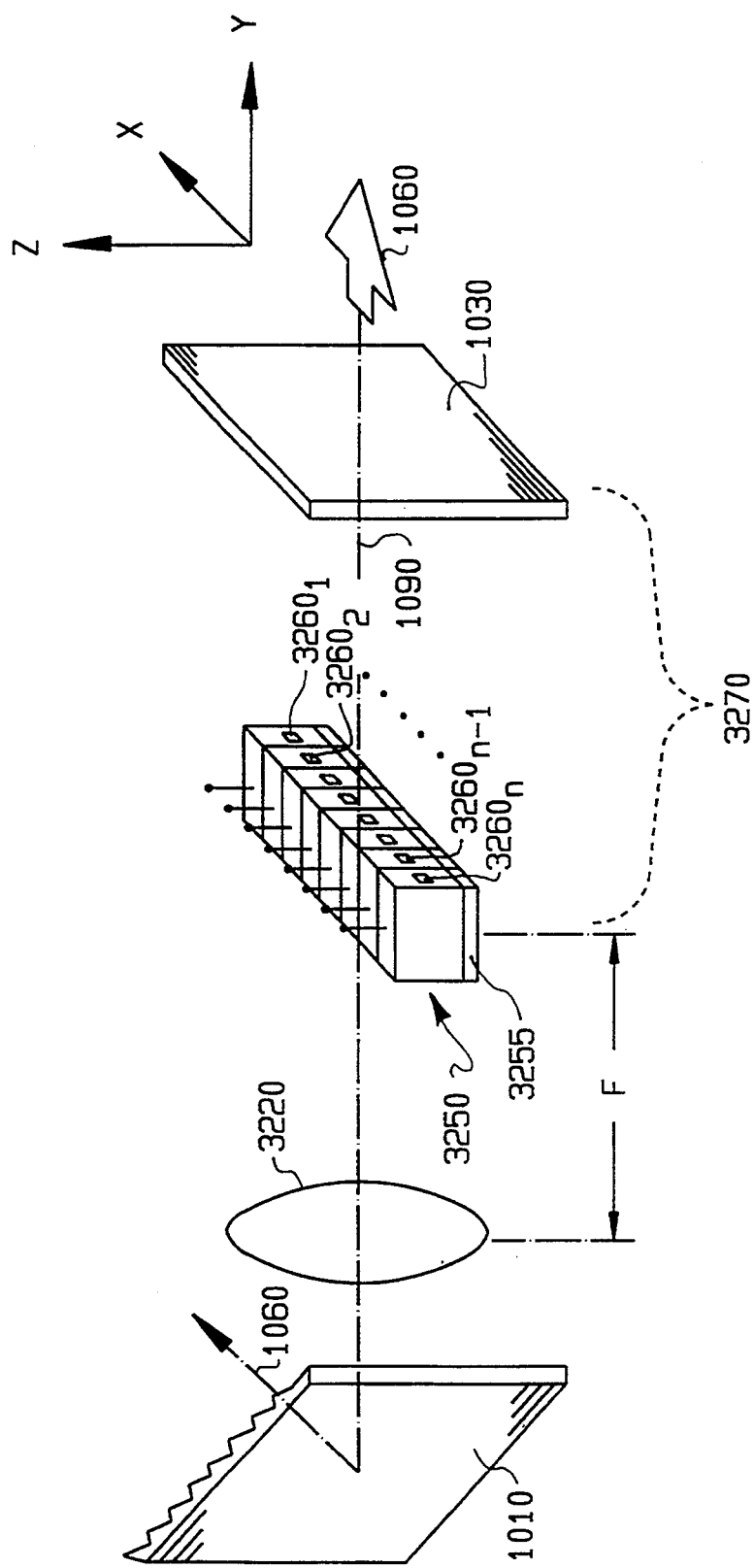
FIG. 32 is a schematic plan of a tenth embodiment of a polychromatic or white light laser having a linear array of laser diodes.
Figure 33:
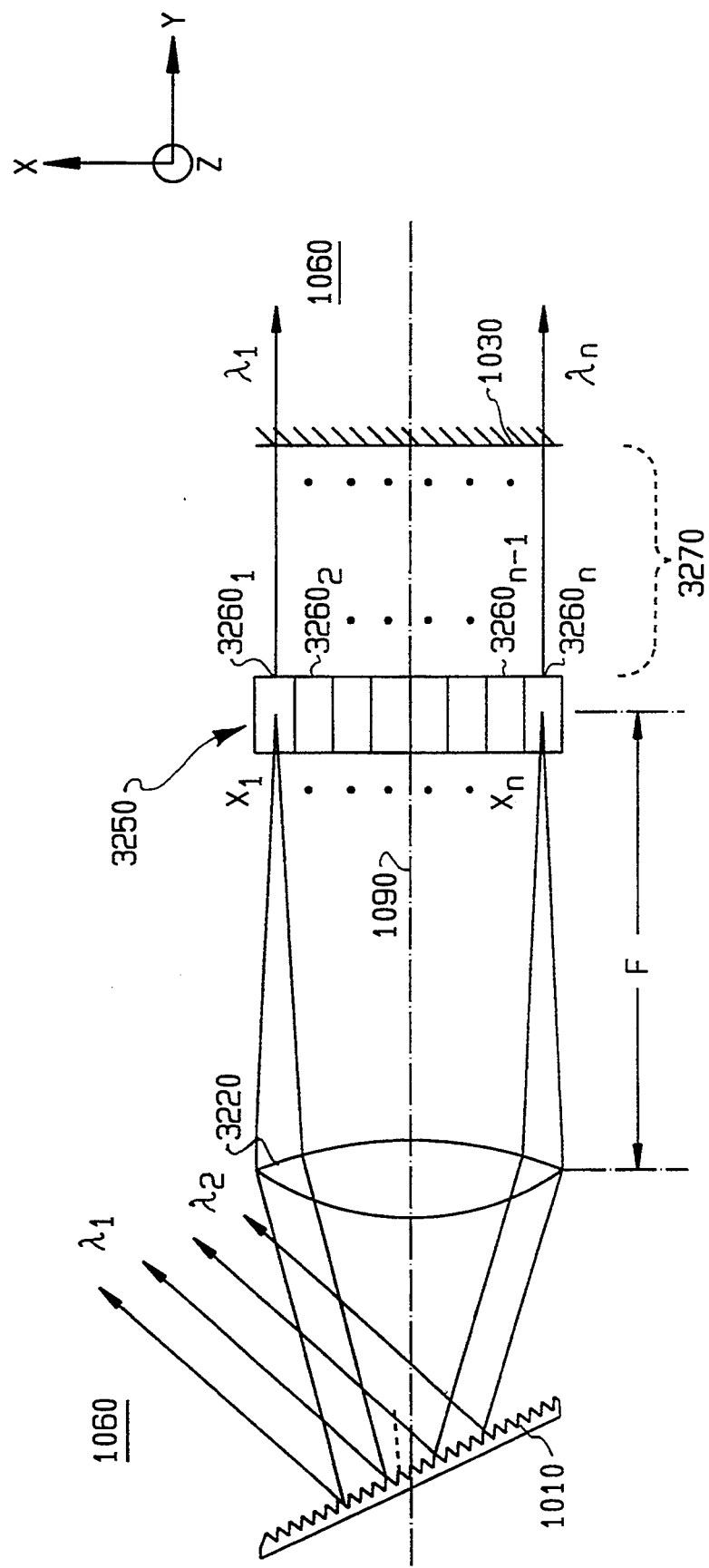
FIG. 33 is an elevation of the polychromatic or white light laser of FIG. 32.

Referring now to FIGS. 32–33, there is illustrated a tenth embodiment of the present invention similar to that of FIG. 10, except that numeral 3250 denotes a linear array of laser diodes. The elements indicated by the same reference numerals as in FIG. 10 are of the same general construction as in that figure.

Laser diode array 3250 consists of multiple emitters $3260_1$–$3260_n$ spaced apart on a monolithic semiconductor substrate 3255. Each of multiple emitters $3260_1$–$3260_n$ comprises, for example, at least p- and n-type semiconductor regions which form a p-n junction. Laser diode array 3250 is positioned a focal length, F, away from an intracavity lens 3320 so as to increase the collection efficiency thereof because of the typically high radiation divergence exhibited by laser diodes. Strong electro-luminescence is achieved from the emitter of each laser diode when electrons in the conduction band drop into a vacancy or "hole" in the valence band that results when, for example, current is injected into the p-n junction. See, for example, Jeff Hecht, "Long Wavelength Diode Lasers are Tailored for Fiberoptics", Laser Focus World, August 1992; and Amnon Yariv, Introduction To Optical Electronics, Second Edition, Holt, Rienehart & Hart, New York (1976).

Figure 34:
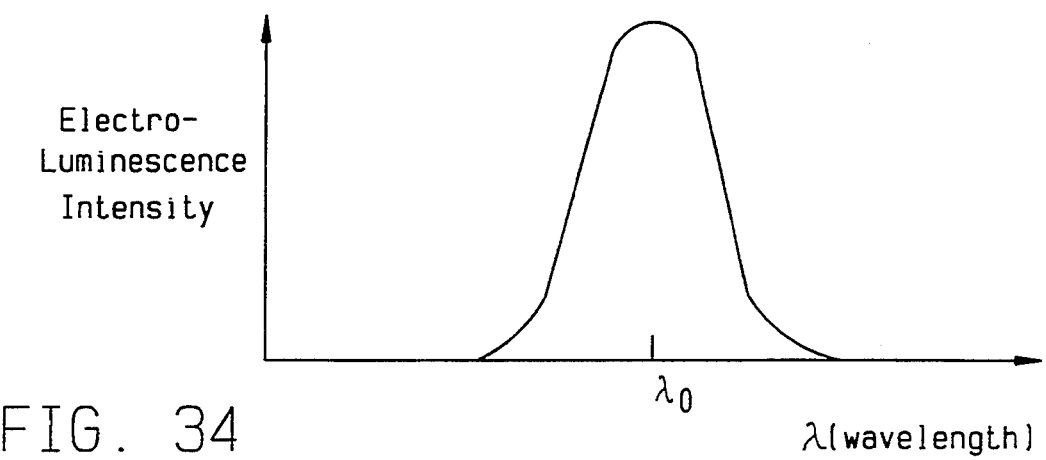
FIG. 34 is a characteristic graph showing the electroluminescence spectrum of a laser diode.

Electro-luminescence from each of multiple emitters $3260_1$–$3260_n$ is collimated by intracavity lens 3220 and directed onto diffraction grating 1010 at an angle of incidence which is dependent on the spatial location of the respective emitter. Diffraction grating 1010 operating in an auto-collimation configuration diffracts the incident radiation such that the desired spectral components of the electro-luminescence are selectively amplified within a respective diode gain medium of laser diode array 3250. Shown in FIG. 34 is a characteristics spectrum of the electro-luminescence of a laser diode.

The semiconductor layers of laser diode array 3250 may be selected from Group III-V or Group II-VI compound semiconductors, depending on the desired spectral range of the electro-luminescence. For example, laser diode array 3250 may be any of the well known GaAlAs linear array laser diode structures, such as the diode structure employed in the SDL-3400 series laser diodes manufactured by Spectral Diode Labs.

Importantly, the end facets of each laser diode is anti-reflective coated so that diffraction grating 1010 and mirror 1060 serve as the ends of the optical cavity. Otherwise, the end facets which are generally partially reflective will form the ends of the optical cavity such that the electro-luminescence resonates back and forth therein to produce lasing. The end facets of the laser diodes may, for example, be anti-reflective coated by thin film deposition.

The operation of this tenth embodiment is substantially similar to that of the second embodiment illustrated in FIG. 10. Importantly, however, population inversion in the active medium is preferably not effected by optically pumping, but rather by current injection, a technique which is well known in the art. Furthermore, emitters $3260_1$–$3260_n$ may be current driven, either individually or in parallel vis-a-vis a current source (not shown) such as to selectively drive one, some or all of the laser diodes.

Figure 35:
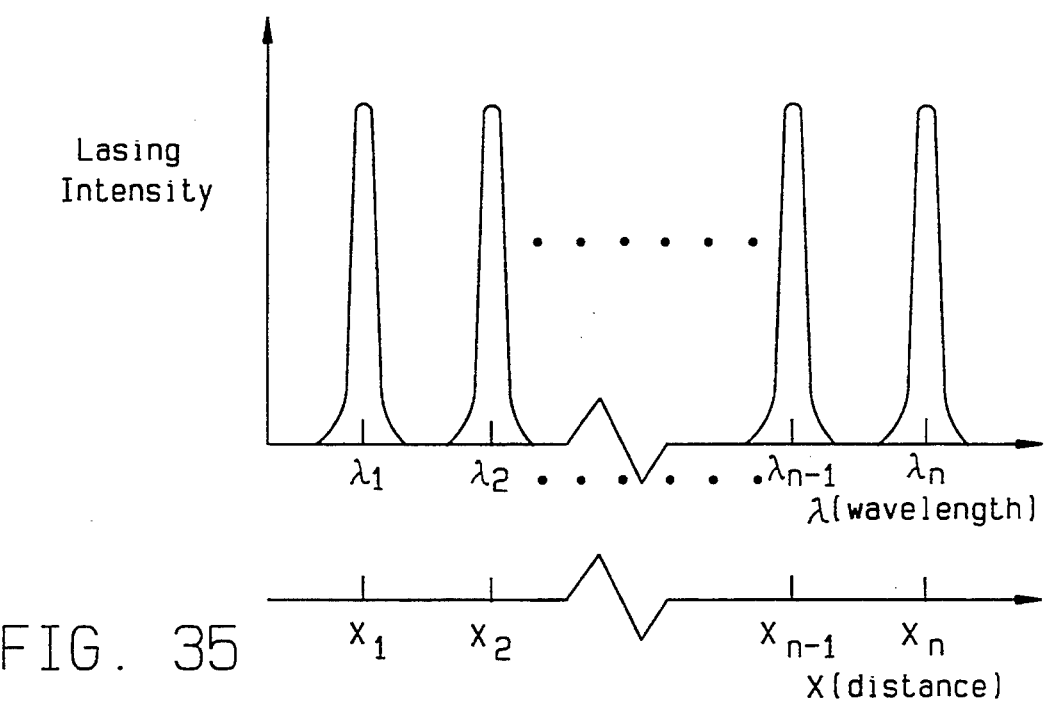
FIG. 35 is a graph of the characteristic lasing wavelength associated with each laser diode of the polychromatic or white light laser of FIG. 32.

In accordance with equations (13–14) the spatial location, $X_i$, of each laser diode along the dispersion axis of diffraction grating 1010 determines the wavelength λ of the corresponding spectral component of polychromatic or white light radiation 1060. Accordingly, the spectral characteristics of the polychromatic or white light radiation can be chosen by judiciously electrically exciting the appropriate diode(s) within laser diode array 3250. Shown in FIG. 35 is an illustrative graph of the lasing wavelength associated for each diode within laser diode array 3250. In FIG. 35, the subscripts refer to the diode numbers. Also, placed beneath the horizontal axis is the corresponding spatial location or coordinate, $X_i$ of the diode.

Although in the tenth embodiment both end facets of each diode are anti-reflective coated, it is contemplated that only the end facets nearest to intracavity lens 3220 need be anti-reflective coated. In this case, the ends of the optical cavity would be formed by diffraction grating 1010 and the reflective end facets, thereby obviating the need for mirror 1030.

Figure 36:
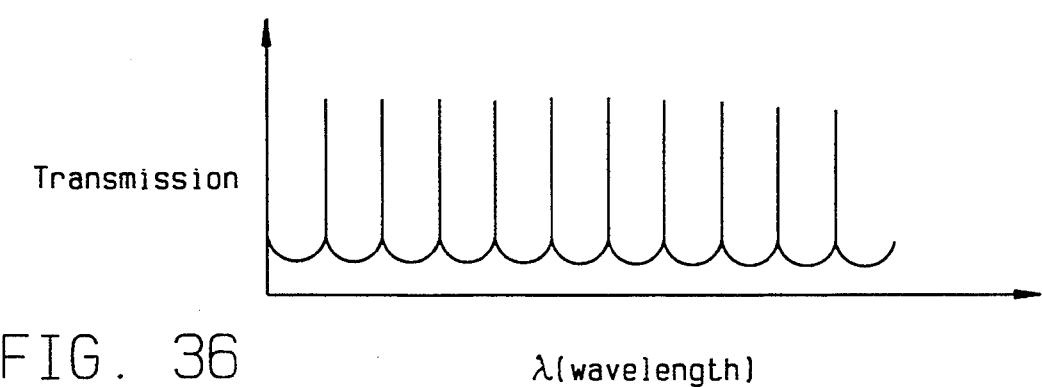
FIG. 36 is a graph of the characteristic transmission of a Fabry-Perot etalon.

Mirror 1030, however, may be used with the reflective end facets to form a Fabry-Perot etalon 3270. Such a Fabry Perot etalon has a characteristic transmission which is dependent on the separation between mirror 1030 and the reflective end facets. Also, the transmissivity is dependent on the refractive index of the optical medium enclosed within the etalon. Shown in FIG. 36 is the characteristic transmission of a Fabry Perot etalon. By adjusting the transmission characteristics of the Fabry Perot etalon, it is contemplated that the desired spectral component(s) of the polychromatic or white light radiation can be transmitted through mirror 1030. In particular, the desired spectral components can be selected for transmission by varying the separation between mirror 1030 and the reflective end facets. Also, this spectral selection can be made by varying the index of refraction of the medium enclosed within the etalon, such as through the electro-optic effect.

The wavelength of each spectral component of polychromatic or white light radiation 1060 in the above embodiments can also be fine tuned by varying the bias current applied to the diodes. Specifically, changing the bias current causes a variation in electron density, which in turn changes the refractive index of the active medium and hence the effective length of the laser cavity. By monitoring the wavelength of the emitted radiation by, for example, an external spectrometer, it is possible to shift the resonant wavelength associated with each diode so as to adjust the spectral components of the polychromatic or white light radiation.

Figure 37:
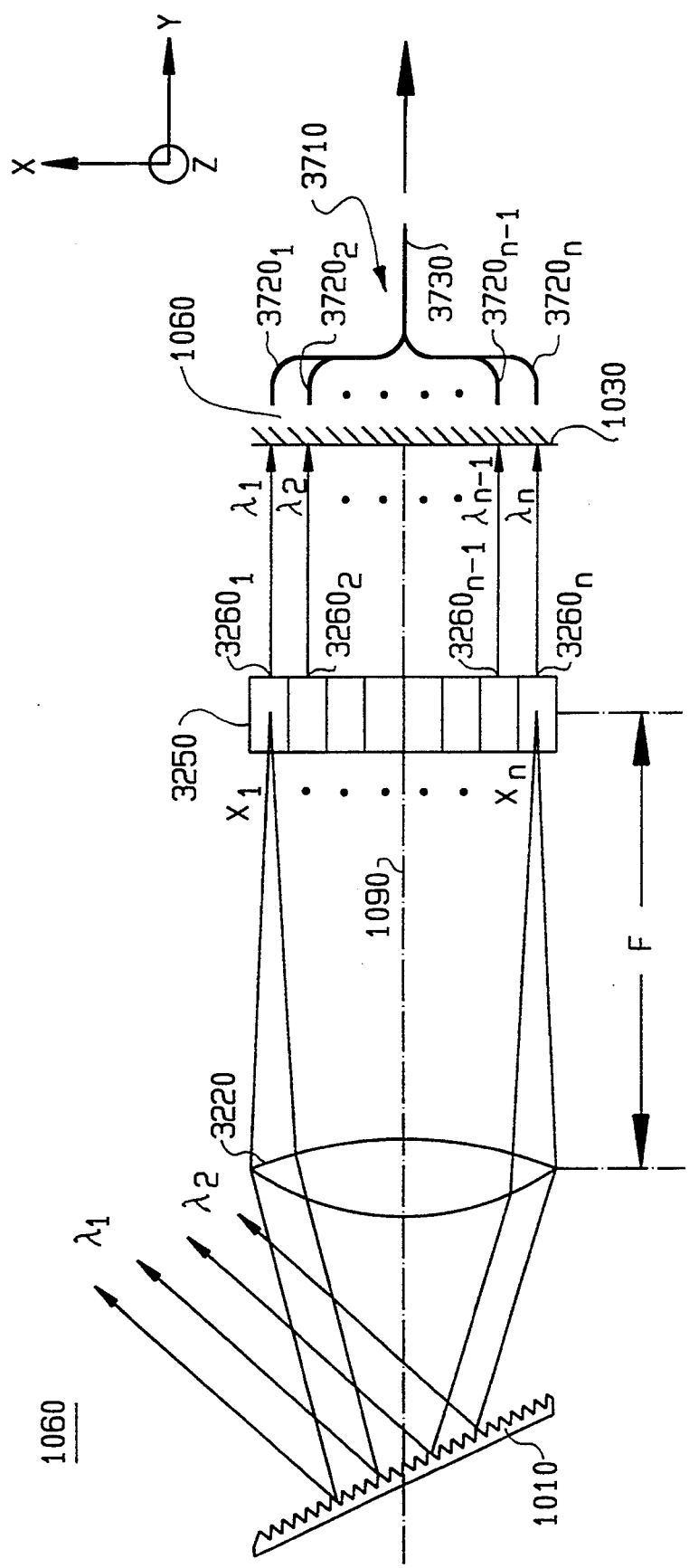
FIG. 37 is a schematic plan of an eleventh embodiment of a polychromatic or white light laser.

In certain applications, such as optical telecommunication, it is desirable to optically couple the polychromatic or white light radiation into an optical fiber. In such applications, passive components, such as $N \times 1$ couplers, can be advantageously used. Show in FIG. 37 is a twelfth embodiment of the present invention employing the polychromatic or white light laser of FIGS. 32-33 in which element 3710 denotes a $N \times 1$ coupler. See, for example, Stewart D. Personick, *Fiber Optics: Technology and Applications,* Plenum Press, New York (1985). $N \times 1$ coupler 3710 comprises n optical fibers $3720_1$-$3720_n$ that branch down into a single output fiber 3730. With each of optical fibers $3720_1$-$3720_n$ positioned adjacent to and aligned with a respective diode of laser diode array 3250, desired spectral component(s) therefrom are coupled through mirror 1030 into optical fiber 3730. $N \times 1$ coupler 3710 may be fabricated using the technique of fiber fusion wherein fibers are melted such that their cores are in close proximity to allow optical coupling therebetween and into a single optical fiber. In this case, mirror 1030 may be removed if the ends of optical fibers $3720_1$-$3720_n$ are of a sufficient reflectivity to effect lasing within the optical cavity formed with diffraction grating 1010.

It is also contemplated that to increase the optical coupling into $N \times 1$ coupler 3710 optical lenses can be employed to focus each spectral component of the polychromatic or white light radiation into the corresponding optical fiber. For example, a lens can be formed at the end of each optical fiber to achieve this benefit.

It should also be understood that other types of couplers or optical components can be used. For example, star couplers, splitters, combiners, and wavelength selective devices which are fabricated using the silica waveguide circuit technology can be used to provide the benefits that result from micro-integration, such as compactness, reliability, low cost and high performance.

Figure 38:
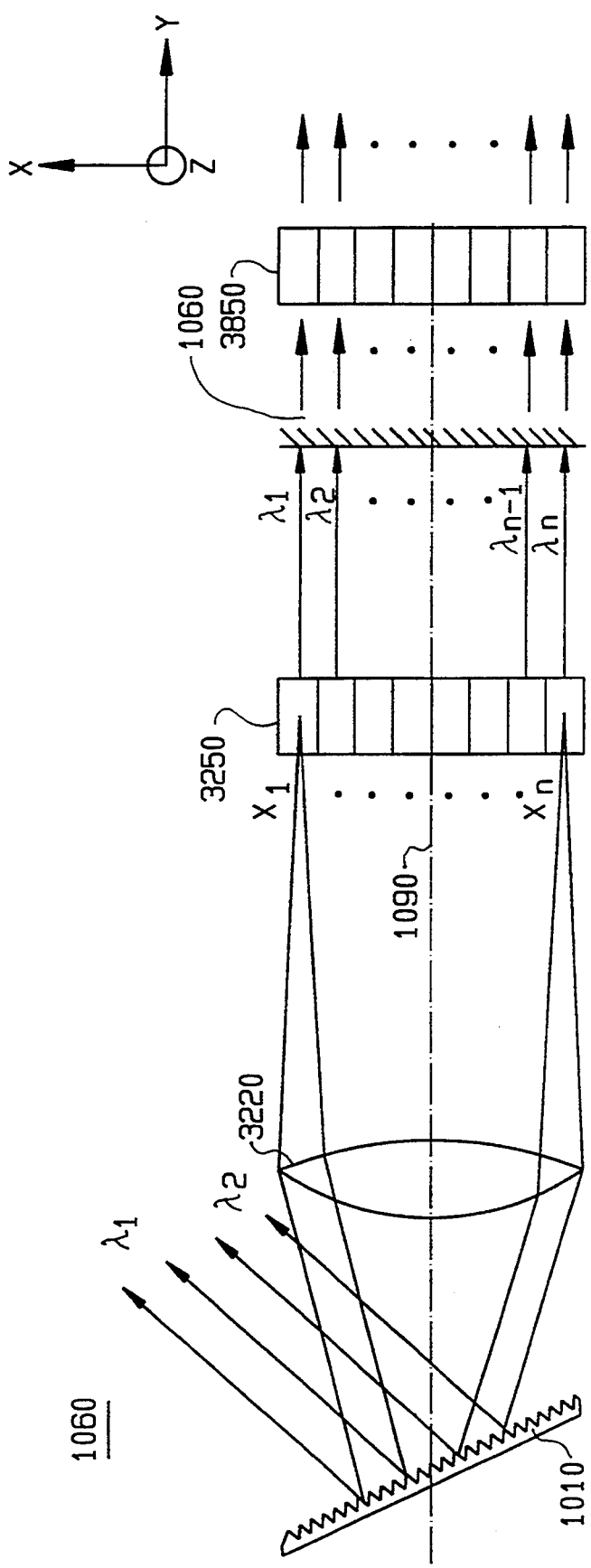
FIG. 38 is a schematic plan of a twelfth embodiment of a polychromatic or white light laser.

Referring now to FIG. 38, there is illustrated a thirteenth embodiment similar to that of FIGS. 32-33 with an external optical amplifier 3850. Optical amplifiers are well known in the art, such as semiconductor optical amplifiers, Erbium-doped fiber amplifiers, and the like. Accordingly, optical amplifiers are not discussed here. However, for a discussion on the operation of optical amplifiers, see, for example, T. Mukai et al., *Optical Amplification By Semiconductor Lasers, Semiconductor and Semi-metals,* Vol. 22 Edited by W. T. Tsang, Part E, Academic Press, (1985).

Preferably, optical amplifier 3850 comprises an array of laser diodes or optical gain mediums having anti-reflective coated end facets. For example, laser diode array 3250 of the previous embodiments can be used as optical amplifier 3850. Each diode or gain medium of optical amplifier 3850 is substantially colinear with the center axis of a respective diode of laser diode array 3250. In this manner, radiation from each element in laser diode array 3250 propagates through a respective element of optical amplifier 3850 and is optically amplified therein. The radiation egressing from each element of optical amplifier 3850 can be intensity modulated by modulating the bias current thereto. Advantageously, this type of external modulation eliminates such problems as "chirp" and relaxation oscillation which are typically associated with the direct modulation of laser diodes.

In optical fiber communication systems where information is transmitted by encoded optical radiation propagating through optical fibers, the use of extremely narrowband lasers operating at a precise predetermined wavelength(s), such as those near 1.3 or 1.55 $\mu$m, is critical to achieving error-free transmission. To achieve this error-free transmission, the lasing wavelength may be maintained within a predetermined range by monitoring the radiation and accordingly adjusting the operating temperature or bias current of the laser. Although this arrangement is adequate for some applications, over time it is quite difficult, if not impossible, to adjust the lasing wavelength by simply adjusting the bias current and/or operating temperature.

According to another aspect of the present invention, the above laser diode array embodiments of the present invention are used in an optical telecommunication system to obviate the above foregoing problem. Advantageously, as the lasing wavelength drifts outside the range over which a diode can be tuned back to the desired transmission wavelength, an adjacent diode within the laser diode array is turned on and accordingly driven with the appropriate bias current to realize the desired wavelength. Those skilled in the art will readily note that this is possible because as the tunable spectral range of one diode drifts outside the desired tuning range, the spectral range of another diode fortuitously drifts within the desired spectral range.

Figure 39:
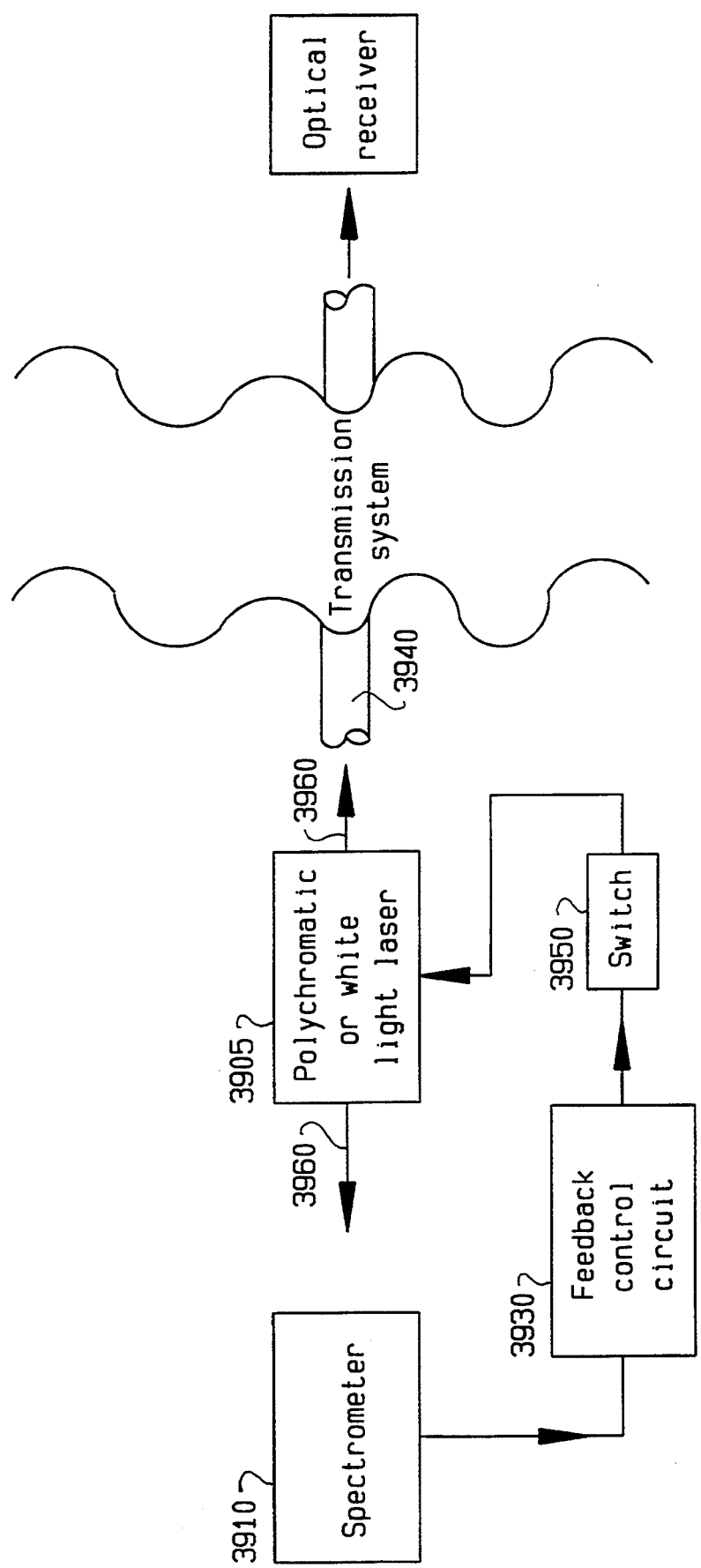
FIG. 39 is a schematic block diagram of a thirteenth embodiment of the present invention wherein the laser diode array embodiments of the polychromatic or white light laser are utilized in an optical telecommunication system.

In a fourteenth embodiment, FIG. 39 illustrates a schematic of an optical telecommunication system in which the laser diode array embodiments of the present polychromatic or white light laser are used as the source of optical radiation 3960. Polychromatic or white light laser 3905 is operated to emit a single spectral component. In operation, a spectrometer 3910 tracks the wavelength of radiation 3960 from polychromatic or white light laser 3905. Feedback control circuit 3930 then compares a signal from spectrometer 3910 to a reference signal corresponding to the desired lasing wavelength. Responsive to this difference, feedback control circuit 3930 adjusts the bias current through a switch 3950 to the appropriate lasing emitter or diode of polychromatic or white light laser 3905 so as to achieve, if possible, the desired lasing wavelength. If, however, the lasing wavelength can not be tuned to lie within an acceptable spectral range over which optical transmission via fiber 3940 is acceptable, switch 3950 redirects the bias current to an adjacent emitter or diode within the laser diode array of polychromatic or white light laser 3905. The bias current applied to the adjacent diode is accordingly adjusted and, if necessary, different adjacent emitters or diodes sequentially driven until the desired lasing wavelength is achieved. Typically, the acceptable spectral range of the lasing wavelength is determined by the transmission characteristics of the entire telecommunication system. Furthermore, white light laser 3905 can be made to emit a plurality of discrete spectral components, each of which can be stabilized in the manner described above.

In an all-optical transmission system, light once generated will be transmitted optically, received by optical detection and, more importantly, amplified optically such that there is no intermediate conversion from optical to electrical and then back to an optical form. In such all-optical transmission systems, wavelength-division multiplexing is typically desirable to exploit the enormous bandwidth potential of the optical fiber. In these optical systems, many narrowly wavelength-spaced optical signals or optical carriers are transmitted over a single-mode fiber. Unfortunately, the optical amplifiers used to amplify the optical signals not only exhibit non-linearaties, but also exhibit a non-uniform spectral optical gain. Such operating characteristics can cause cross-talk as well as amplitude non-uniformity in the optical carriers.

Figure 40:
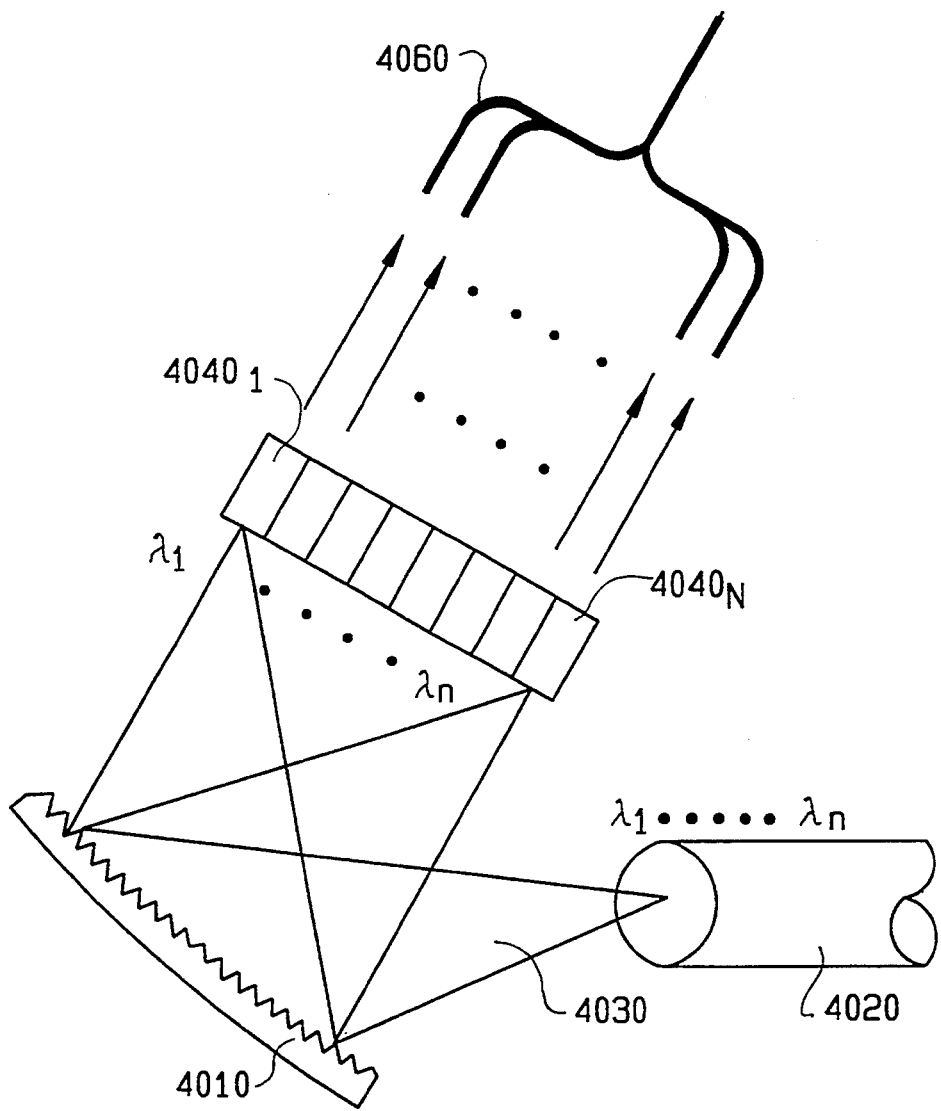
FIG. 40 is a schematic plan of a fourteenth embodiment of the present invention used for optically amplifying a plurality of optical carriers egressing from an optical fiber.

According to another aspect of the invention, shown in FIG. 40 is a fifteenth embodiment of the present invention that provides a solution to the above foregoing problem in the prior art. It is based upon the discovery that optically amplifying each optical carrier within a separate optical amplifier substantially reduces, if not eliminates, the optical cross-talk and non-uniformity in the spectral optical gain.

Concave diffraction grating 4010 redirects optical radiation 4030, comprising a plurality of optical carriers $\lambda_1-\lambda_n$, from optical fiber 4020 onto a linear array of optical amplifiers 4040$_1$–4040$_n$. Preferably, linear array of optical amplifiers 4040$_1$–4040$_n$ comprises an array of laser diodes, each having its end facets anti-reflective coated so as to suppress lasing within the diode structure. Laser diode arrays of the previous embodiments can be used as the linear array of optical amplifiers 4040$_1$–4040$_n$.

In operation, concave diffraction grating 4010 diffracts optical radiation 4030 such that each spectral component thereof is uniquely redirected and focused onto a respective element of linear array of optical amplifiers 4040$_1$–4040$_n$. Each optical amplifier within the linear array amplifies a unique spectral component or optical carrier. Importantly, each optical amplifier can be appropriately biased so that each optical carrier, albeit of a different wavelength, egresses with substantially the same optical intensity. Moreover, since each optical amplifier is physically separated from each other, the optical cross-talk between the optical carriers is substantially reduced, if not eliminated. A N×1 coupler 4060 optically couples the egressing radiation from each optical amplifier into a single optical fiber for distribution to other parts of the optical network, if desired. Also, coupling lenses can be used to increase the collection efficiency.

Figure 41:
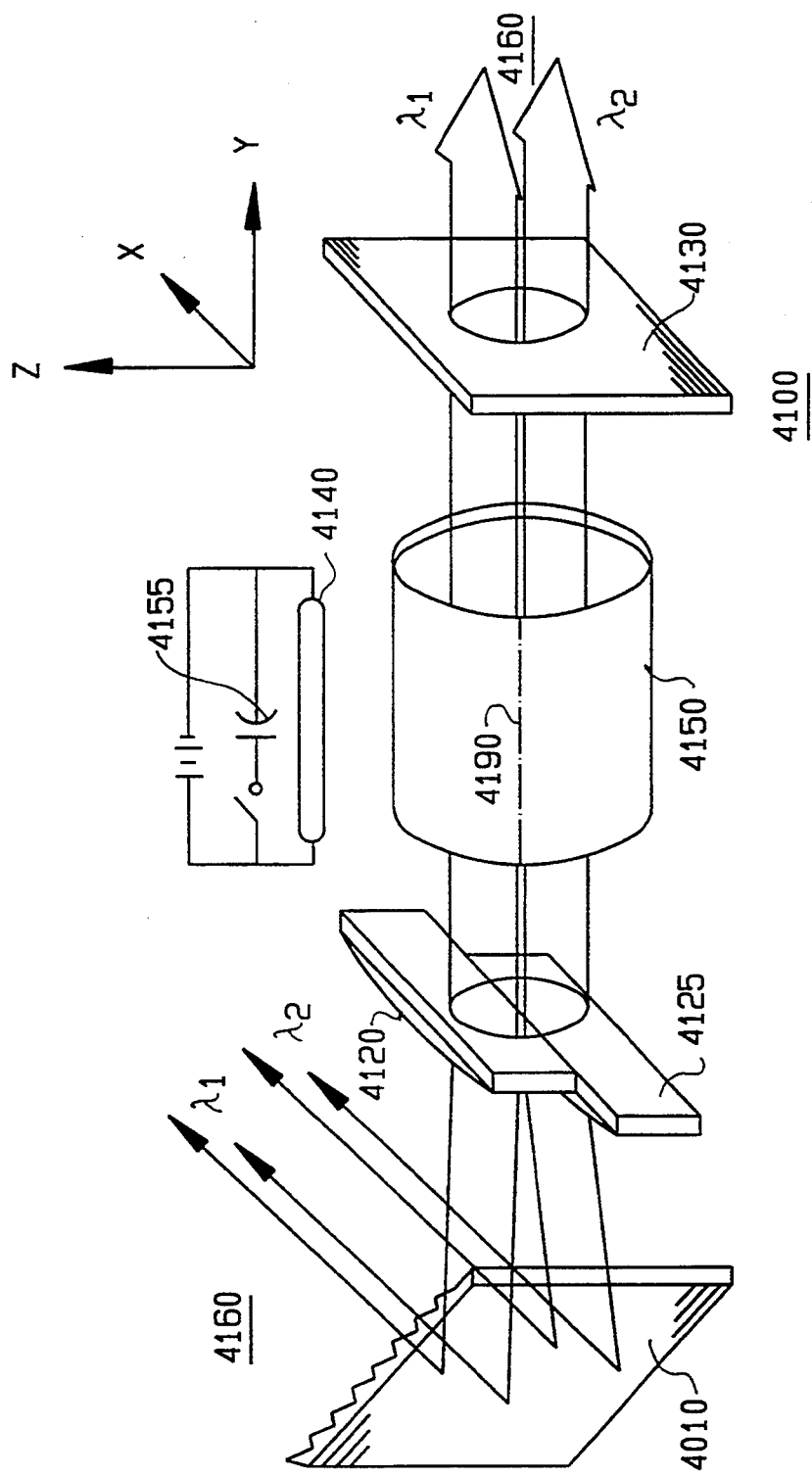
FIG. 41 is a schematic plan of a fifteenth embodiment of a polychromatic or white light laser with a flashlamp pumping configuration.

In the above embodiments, lasing is preferably effected by optical pump beamlets or by current injection. For some applications, however, it is desirable to use a flashlamp to effect population inversion. Shown in FIG. 41 is a sixteenth embodiment of the present invention in which polychromatic radiation is generated by a flashlamp pumping based laser. Polychromatic laser 4100 comprises a diffraction grating 4110, cylindrical lenses 4120 and 4125, partially reflecting mirror 4130, flashlamp 4140 and active medium 4150. Active medium 4150 is disposed between lenses 4120, 4125 and mirror 4130. Polychromatic radiation 4160 is provided either by way of mirror 4130 or by one of the diffraction orders of diffraction grating 4110.

Flashlamp 4040 discharges charge stored in a capacitor bank 4155 across the lamp to generate a high optical flux which is incident on active medium 4150 to effect spontaneous emission therein. The optical axes of lenses 4120 and 4125 are offset with respect to each other along the dispersion axis (X-axis) of diffraction grating 4110. Radiation from active medium 4150 incident on lens 4120 is refracted onto diffraction grating 4110 at an angle of incidence $\phi_1$ that is dependent on its offset from optical axis 4190 along the dispersion axis and its focal length, $F_1$. Similarly, radiation incident on lens 4125 is incident on diffraction grating 4110 at angle of incidence $\phi_2$ that is dependent on its offset and its focal length, $F_2$. Diffraction grating 4110 is operated in an auto-collimation configuration. Positive feedback or forced oscillation is only satisfied for radiation at wavelengths $\lambda_1$ and $\lambda_2$ in accordance with the general auto-collimation equation given by:

$$\lambda = \frac{2d\sin\phi}{K} \tag{29}$$

where K is the diffraction grating order, $\phi$ is the angle of incidence of the radiation on diffraction grating 4110, and d is the period of diffraction grating. In accordance with equation (29), polychromatic radiation 4160 comprises spatially separated radiation wavelengths $\lambda_1$ and $\lambda_2$ along a direction (Z-axis) perpendicular to the dispersion axis of diffraction grating 4110.

To fully realize the benefits that result from micro-integration, such as compactness, reliability, low cost and high performance, the laser diode embodiments of the present invention can be fabricated using the recently developed technology of hybrid optoelectronic integration. See, for example, C. H. Henry et al., "Glass Waveguides on Silicon for Hybrid Optical Packaging," *Journal of Lightwave Technology*, Vol. 17, No. 10, pp. 1530–39 (1989); J. W. Parker, "Optical Interconnection for Advanced Processor Systems: A Review of the ESPRIT II OLIVES Program," *Journal of Lightwave Technology*, Vol. 9, No. 12, pp. 1764–73 (1991); and M. J. Wale et al., "A New Self-Aligned Technique for the Assembly of Integrated Optical Devices with Optical Fibre and Electrical Interfaces," *Proceedings of the European Conference on Optical Communications* (ECOC), Paper No. Tha19-7, pp. 368–71 (1989), which are incorporated herein by reference.

Figure 42:
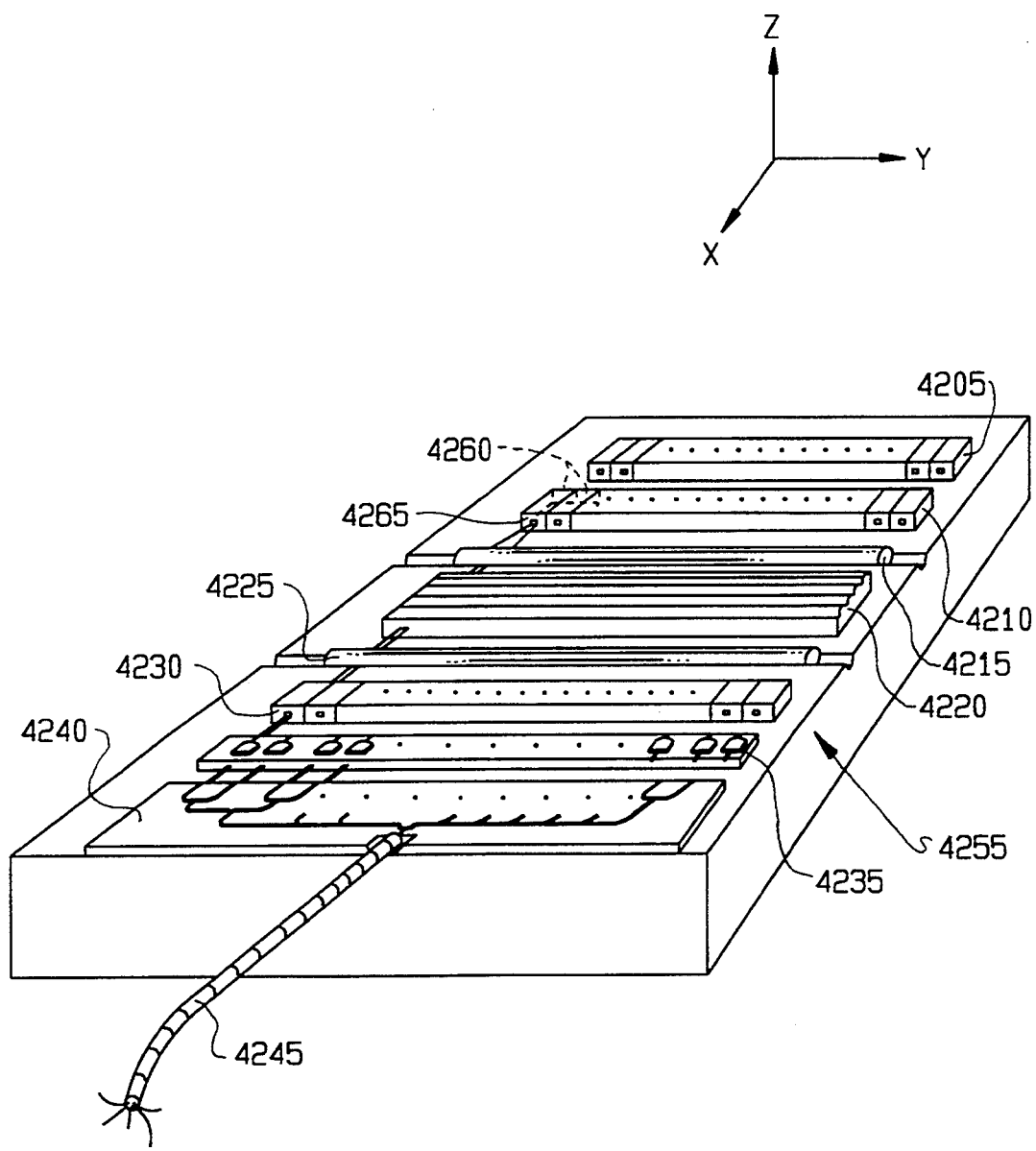
FIG. 42 is a schematic plan of a seventeenth embodiment of a hybrid multi-wavelength tunable laser in accordance with the principles of the invention.

In accordance with principles of the invention, shown in FIG. 42 is a seventeenth embodiment of the present invention similar to that of FIG. 32, except that the device is fabricated in a hybrid optoelectronic integrated form. Multi-wavelength tunable laser 4200 comprises a linear array of photodetectors 4205, linear array of laser diodes 4210, microlens 4215, distributed bragg reflector (DBR) 4220, microlens 4225, linear array of optical amplifiers 4230, linear array of modulators 4235, N×1 coupler 4240 and optical fiber 4245. Preferably, the optoelectronic devices are monolithically integrated using standard fabrication techniques, such as metal-organic vapor phase epitaxy (MOVPE), selective wet chemical etching, reactive ion etching, and the like.

Furthermore, these devices are mechanically supported on a platform 4255. Metallic trace patterns fabricated on platform 4255 can be used to electrically contact the optoelectronic devices of multi-wavelength tunable laser 4200. Also, the optoelectronic devices can either be epoxied or soldered to the metallic trace patterns of platform 4255, affixing each device to platform 4255. For example, alloy compositions of lead and tin can be used for soldering.

Platform 4255 can comprise one or more submounts of copper, diamond, silicon, ceramic, or the like. The material chosen for platform 4255 is dependent on the desired application with respect to mechanical, thermal and electrical considerations. Preferably, the choice of material for platform 4255 is silicon since it is possible to exploit IC manufacturing technology to achieve interconnections on the platform with submicron dimensional control. Moreover, because of the crystalline nature of silicon, features such as V-grooves and pits can be used for purpose of integrating optical fibers, lenses, and the like.

Laser diode array 4210 comprises multiple emitters spaced apart along the Y-axis, as shown in FIG. 42. Typically, each emitter is ~4×1 μm, with each emitter spaced ~125 μm apart. Laser diode array 4210 may be any of the well known GaAlAs or InGaAsP/InP laser diode array structures. See, for example, C. A. Armiento et al., "Passive Coupling Of An InGaAsP/InP Laser Array and Single Mode Fibers using Silicon Waferboard", *Proceedings Optical Fiber Communications Conference*, February 1991, which is incorporated herein by reference. End facets 4260 of laser diode array 4210 are coated with a reflective layer so as to form an optical cavity with DBR 4220 along an optical axis, the x-axis. End facets 4265, however, are anti-reflective coated to ensure that lasing occurs within each diode structure or gain medium of laser diode array 4210. Laser diode array 4210 is positioned preferably a focal length, F, away from cylindrical microlens 4215 along the X-axis. Preferably, cylindrical microlens 4215 is realized by an optical fiber. See, for example, J. D. Crow et al., "GaAs Laser Array Source Package," *Optics Letters*, Vol. 1 No. 1, pp. 40–42, (1977), which is incorporated herein by reference. Also, it is contemplated that ball lenses disposed within pyramid-shaped pits can be used as microlens 4215.

Cylindrical microlens 42 15 is positioned with respect to laser diode array 4210 through the use of a silicon V-groove etched in silicon platform 4255. The V-groove formation is based on the anisotropic etching characteristics of single crystal silicon, typically having a <100> orientation. The dimensions of the V-groove are chosen such that the optical axis of cylindrical microlens 4250 is substantially co-linear with the center axes of the emitters of laser diode array 4210. The expression that governs the relationship between the height H from the surface of silicon platform 4255 of microlens 4215 is given by $$H = \frac{\sqrt{3}}{2} D - \frac{W}{\sqrt{2}} \quad (30)$$

where W is the width of the V-groove, D is the diameter of microlens 4215, and H is the position of the center of the microlens with respect to the surface of the silicon platform or substrate 4255.

Figure 43:
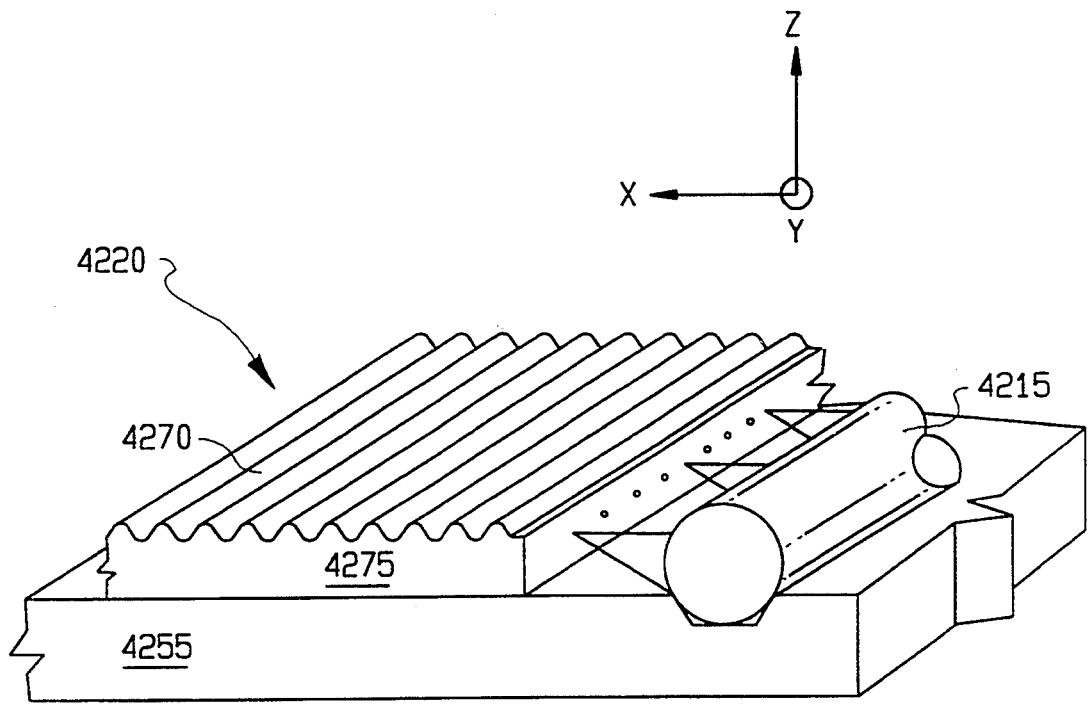
FIG. 43 is a cross-sectional view of the distributed bragg reflector used in the hybrid multi-wavelength tunable laser of FIG. 42.

Electro-luminescence from each diode structure or emitter of laser diode array 4210 is collimated by cylindrical microlens 4215 and directed substantially normal to the surface (y-z plane) of DBR 4220 in accordance with the spatial position of the respective emitter along the y-axis. DBR 4220 comprises a periodic grating 4270 and a passive waveguide region 4275 located underneath, as shown in FIG. 43. For incident radiation at a bragg wavelength $\lambda_B$, radiation is strongly back reflected along the propagation axis of the incident radiation. For a first-order grating positioned over waveguide region 4275, the bragg wavelength $\lambda_B$ is given by:

$$\lambda_B = 2 n_{eff} \Lambda \quad (31)$$

where $n_{eff}$ is the effective index of the guided mode in the waveguide region and $\Lambda$ is the grating period. See, H. Kogelnik et al., *Journal of Applied Physics*, Vol. 43, No. 5, pp. 2327–35 (1972).

Figure 44:
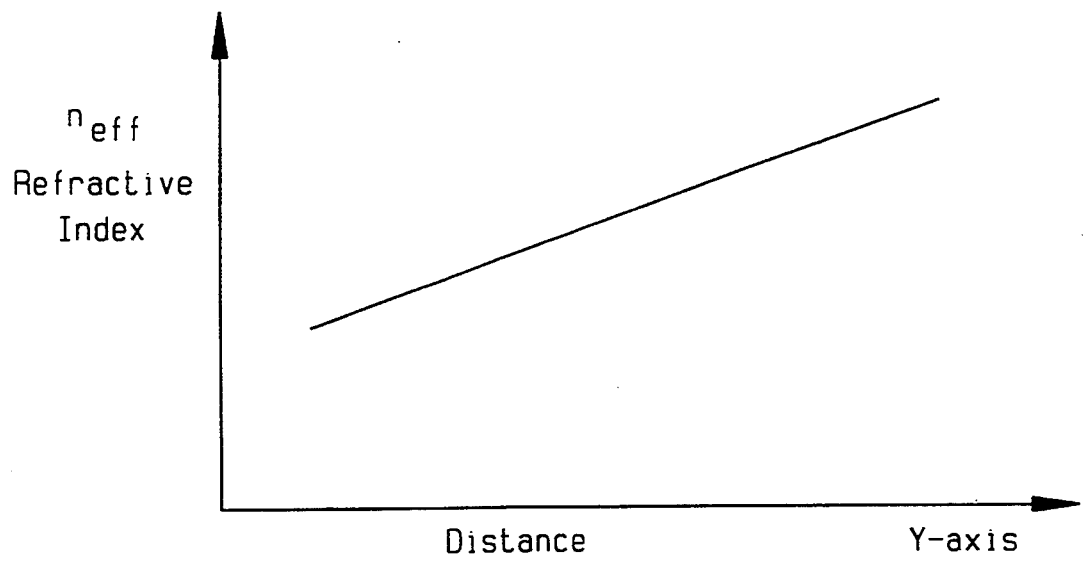
FIG. 44 is a graph of the characteristic effective index of refraction of the passive waveguide region of the distributed bragg reflector illustrated in FIG. 43.

Accordingly, for radiation incident on DBR 4220, only one wavelength component of the electro-luminescence for each emitter will be back reflected and amplified within a respective diode gain medium of laser diode array 4210. Varying the effective index of refraction along the direction (y-axis) in which the diodes of laser diode array 4210 are spaced apart ensures that forced oscillation for each diode occurs at a different desired wavelength. This is so because the bragg wavelength varies with the spatial location of the incident radiation on the surface (y-z plane) of DBR 4220 due to the spatial variation in the refractive index thereof along the y-axis. Shown in FIG. 44 is a characteristic profile of the index of refraction of DBR 4220.

Passive waveguide region 4275 supports the propagation of incident radiation until the amplified radiation egresses therefrom. In general, passive waveguide region 4275 is understood to include dielectric waveguides, multiple quantum well waveguides, metal-indiffused lithium niobate or lithium tantalate waveguides, and the like. Conventional fabrication techniques, such as liquid phase epitaxy (LPE), molecular beam epitaxy (MBE) or vapor phase epitaxy (VPE), which are well known in the art, can be used to fabricate DBR 4220. In fabricating periodic grating 4270 on the surface of passive waveguide 4275, standard masking and etching techniques can be employed, including interferometric or holographic techniques. Shape, depth and pitch or period of grating 4270 are variable and depend on the grating placement together with the result desired therefrom. Moreover, ion implantation or diffusion can be used to spatially vary the refractive index of passive waveguide region 4275 along the y-axis to effect the desired lasing wavelengths. It should also be understood that the refractive index of the passive waveguide can be varied by applying an electrical field or by injecting current thereto for tuning the lasing wavelengths of multi-wavelength tunable laser 4200.

Preferably, population inversion in the active medium or diode of laser diode array 4210 is effected by current injection such that each diode can be driven, either individually, in parallel or in any combination so as to turn on one, some or all of the laser diodes. In this manner, selectively driving the appropriate diodes generates the desired spectral components of the radiation egressing from multi-wavelength tunable laser 4200 for the desired application.

External linear array of photodetectors 4205 can be used, if desired, to monitor the output optical power from each diode structure or emitter of laser diode array 4210. Photodetector array 4205 comprises, for example, multiple p-i-n photodiodes spaced apart in accordance with the spacing of the emitters of laser diode array 4210. Also, each photodiode of photodetector array 4205 is substantially collinear with center axis of a respective diode of laser diode array 4210. In this manner, radiation from each element in laser diode array 4210 is optically detected by a respective photodiode of photodetector array 4205.

The semiconductor layers of photodetector array 4205 can be selected from Group III-V and II-VI compound semiconductors, depending on the desired spectral range of detection. For example, photodetector array 4205 can be any of the well known GaAlAs and InP/GaInAs p-i-n photodiode structures, such as the p-i-n photodiode structures disclosed in the articles by O. Wada et al., "High Performance, High Reliability InP/GaInAs p-i-n Photodiodes and Flip-Chip Integrated Receivers for Lightwave Communications," *Journal of Lightwave Technology*, Vol. 9, No. 9, pp. 1200–07 (1991); E. Y. Chan et al., "High Uniformity, Low Cost Packing of Multi-Channel InGaAs Photodetector Arrays for Parallel-Bus Optical Interconnects," *Proceedings of the IEEE LEOS '90 Conference*, pp. 335–36 (1990); and M. J. Tabasky et al., "Four Channel Hybrid Receiver Utilizing a Silicon Substrate For Packaging," *Proceedings of SPIE Conference*, No. 1582, pp. 152–57 (1992), which are incorporated herein by reference.

Similarly, other linear arrays of optoelectronic devices may be utilized in the present invention. For example, linear array of optical amplifiers 4230 which is positioned after DBR 4220 can be used to optically amplify the egressing radiation, whereas linear array of optical modulators 4235, such as those based on a lithium niobate Mach-Zehnder configuration can be used to optically modulate the egressing radiation vis-a-vis the electro-optic effect. Furthermore, travelling wave phase modulators can be used as modulator array 4235. For example, $LiNbO_3$ phase modulators based on the structure of the APE TM phase modulators sold by United Technologies Photonics can be used for optical modulator array 4235. Also, to increase the collection efficiency of the radiation into optical amplifier array 4230, microlens 4225 can also be used to match the size of the egressing radiation from DBR 4220 to the dimensions of optical amplifier array 4230. In particular, an optical fiber or ball lenses can be used as microlens 4225 to realize this benefit.

Furthermore N x 1 optical coupler 4240 fabricated by depositing doped silica waveguides on a silicon substrates can advantageously be used to couple the multi-wavelength tunable radiation into single optical fiber 4245. See, for example, J. T. Boyd et al., *Optical Engineering*, Vol. 24, No. 2 pp. 23–4 (1985); F. S. Itickernell, *Solid State Technology*, Vol. 31, No. 11, pp. 83–8 (1988); C. H. Henry et al., *Journal of Lightwave Technology*, Vol. 7, 1379–85 (1989). It should be understood that optical fiber 4245 can similarly be positioned to N x 1 optical coupler 4240 through the use of a V-groove.

The optoelectronic devices of multi-wavelength tunable laser 4200, such as photodetector array 4205, laser diode array 4210, modulator array 4235, and the like, are precisely placed relative to each other such that the center axes of the respective elements in the arrays are substantially collinear. This precise relative placement is effected through the use of complementary features, such as solder bumps, mechanical features or optical fiducials, that are fabricated on the platform and/or on the undersides of the optoelectronic devices.

Preferably, alignment stoppers are fabricated on silicon platform 4255 to align the optoelectronic devices on the plane of the platform surface (x-y plane). More specifically, the accurate placement of the devices is achieved by sliding the each device up against, for example, two or three alignment stoppers formed on silicon platform 4255 by reactive ion etching. The devices are fabricated with a notch edge located at a precisely controlled distance and pushed into contact with sides of the stoppers to position the device with respect to each other along the x- and y-axes in the desired manner. Moreover, the height of each device above silicon platform 4255 (z-axis) can be fixed to the desired distance by mounting the device on pedestal(s), the thickness of which is controlled during the fabrication of the platform. For a detailed discussion on the passive alignment of optoelectronic components, see, C. A. Armiento et al., "Gigabit Transmitter Array Modules on Silicon Waferboard," *Proceedings of the IEEE Transactions on Components, Hybrids and Manufacturing*, Vol. 15, No. 6, pp. 1072–80, (1992); and C. A. Armiento et al., Passive Coupling of an InGaAsP/InP Laser Array and Single Mode Fibers Using Silicon Waferboard," *Electronics Letters*, Vol. 72, pp. 1109–11 (1991), each of which is incorporated herein by reference.

It is understood that various other modifications will also be readily apparent to those skilled in the an without departing from the scope and spirit of the invention. For example, vertical cavity surface emitting lasers can be used as the linear array of laser diodes. See, J. P. Donnelly, "Two-Dimensional Surface Emitting Arrays of GaAs/AlGaAs Laser," *Lincoln Laboratory Journal*, Vol. 3, No. 3, (1990); and Jack L. Jewell et al., "Surface-Emitting Lasers Emerge From The Laboratory," *Laser Focus World*, (May 1992). Accordingly, it is not intended that the scope of the claims appended hereto be limited to the description set forth herein, but rather that the claims be construed as encompassing all the features of the patentable novelty that reside in the present invention, including all features that would be treated as equivalents thereof by those skilled in the art to which this invention pertains.

We claim:

1. A laser comprising:
   an active medium;
   means for pumping said active medium to emit spontaneous emission from different portions thereof, said spontaneous emission having a plurality of spectral components;
   first reflective means for reflecting the spontaneous emission from said active medium; and
   distributed bragg reflector means having an associated spatially varying peak reflective wavelength profile along a first direction for producing a plurality of optical cavities with said first reflective means along a second direction, said active medium interposed between said first reflective means and said distributed bragg reflector means, said second direction substantially perpendicular to said first direction, said active medium and said distributed bragg reflector means arranged such that each spectral component of the spontaneous emission radiation from said active medium is amplified to generate radiation having at least one spectral component.

2. The laser of claim 1 wherein said active medium includes a linear array of laser diode structures.

3. The laser of claim 1 wherein said distributed bragg reflector means includes a periodic grating and a waveguide region, said periodic grating disposed on said waveguide region.

4. The laser of claim 2 wherein said laser diode structure includes first and second end facets, said first end facet partially reflective so as to form said first reflective means.

5. The laser of claim 1 further comprising a lens disposed between said active medium and said distributed bragg reflector means for focusing radiation from said active medium onto said distributed bragg reflector means.

6. The laser of claim 5 wherein said lens is a cylindrical lens.

7. A laser comprising:
a linear array of active medium elements disposed along a first direction;
means for pumping said active medium elements to emit radiation;
reflective means for reflecting the radiation from said active medium elements; and
a distributed bragg reflector having an associated spatially varying bragg wavelength, $\lambda_B$, profile along said first direction, said reflective means and said distributed bragg reflector spaced apart from each other to form for each active medium element an associated optical cavity along a second direction, with said linear array of active medium elements interposed therebetween, said second direction substantially perpendicular to said first direction,
said linear array of active medium elements and said distributed bragg reflector arranged for radiation from each active medium element to be incident at a predetermined angle of incident on a different portion of said distributed bragg reflector such that radiation from said active medium element substantially at the wavelength, $\lambda_B$, associated with that portion of said distributed bragg reflector is back reflected along said predetermined angle of incident and amplified by the active medium element to produce radiation having at least one spectral component.

8. The laser of claim 7 further comprising a platform, said linear array of active medium elements, said distributed bragg reflector, and said reflective means being disposed on said platform.

9. The laser of claim 8 wherein said platform includes silicon.

10. The laser of claim 8 wherein said linear array of active medium elements is monolithically integrated.

11. The laser of claim 7 wherein each of said active medium elements has first and second end facets.

12. The laser of claim 11 wherein said first end facets are partially reflective so as to form said reflective means.

13. The laser of claim 11 wherein said first end facets are anti-reflective coated.

14. The laser of claim 7 wherein said distributed bragg reflector includes a periodic grating and a waveguide region, said periodic grating disposed on said waveguide region.

15. The laser of claim 7 wherein said distributed bragg reflector is made of lithium niobate.

16. The laser of claim 7 wherein each of said active medium elements includes a laser diode structure.

17. The laser of claim 8 wherein said means for pumping said active medium elements to emit radiation includes means for applying a bias current to each of said active medium elements.

18. The laser of claim 17 wherein said active medium elements are selectively current biased in accordance with a desired wavelength of said at least one spectral component.

19. The laser of claim 7 further comprising a microlens disposed between said linear array of active medium elements and said distributed bragg reflector for focusing radiation from each of said active medium elements onto said distributed bragg reflector.

20. The laser of claim 19 wherein said microlens is a cylindrical lens.

21. The laser of claim 20 wherein said cylindrical lens is an optical fiber.

22. The laser of claim 7 further comprising a linear array of optical amplifiers, each of said optical amplifiers substantially aligned with a respective active medium element of said linear array for amplifying radiation from the respective active medium element.

23. The laser of claim 22 wherein said linear array of optical amplifiers is monolithically integrated.

24. The laser of claim 7 further comprising a linear array of photodetectors, each of said photodetectors substantially aligned with a respective active medium element of said linear array for monitoring radiation from the respective active medium element.

25. The laser of claim 24 wherein said linear array of photodetectors is monolithically integrated.

26. The laser of claim 7 further comprising a $N \times 1$ optical coupler for coupling radiation from each of said active medium elements into an optical fiber, where N is the number of active medium elements.

27. The laser of claim 7 further comprising a linear array of optical modulators, each of said optical modulators substantially aligned with a respective active medium element of said linear array for modulating radiation from the respective active medium element.

28. The laser of claim 27 wherein said linear array of optical modulators includes a Mach-Zehnder interferometer.

29. The laser of claim 27 wherein said linear array of optical modulators includes $LiNbO_3$ phase modulators.

30. The laser of claim 27 wherein said linear array of optical modulators is biased in accordance with a desired amplitude modulation of the radiation from said active medium elements.

31. The laser of claim 27 wherein said linear array of optical modulators is biased in accordance with a desired phase modulation of the radiation from said active medium elements.

32. A laser for generating polychromatic or white light radiation having a plurality of wavelength components, said laser comprising:
an optical platform;
an active medium element;

means for pumping said active medium element to emit spontaneous emission from different portions thereof, said spontaneous emission having a predetermined spectrum;

reflective means for reflecting the spontaneous emission; and dispersive means for reflecting a wavelength component of the spontaneous emission to a different portion of said active medium element for amplification therein, said reflective and dispersive means spaced apart from each other to form for each of said different portions of said active medium element an associated optical resonant cavity, with said active medium element interposed between said reflective and dispersive means, said active medium element, reflective means and dispersive means disposed on said optical platform to form a hybrid optoelectronic laser.

33. The laser of claim 32 wherein said active medium element is monolithically integrated.

34. The laser of claim 32 wherein said active medium element includes a linear array of laser diode structures.

35. The laser of claim 32 wherein said dispersive means includes a distributed bragg reflector.

36. The laser of claim 35 wherein said distributed bragg reflector includes a periodic grating and a waveguide region, said periodic grating disposed on said waveguide region.

37. The laser of claim 35 wherein said distributed bragg reflector has an associated spatially varying bragg wavelength, $\lambda_B$, profile along a first direction wherein radiation from a different portion of said active medium element is incident at a predetermined angle of incident on a different portion of said distributed bragg reflector such that radiation substantially at the wavelength, $\lambda_B$, associated with that portion of said distributed bragg reflector is back reflected along the angle of incident and amplified by said different portion of said active medium element.

38. The laser of claim 32 wherein said optical platform includes silicon.

39. The laser of claim 32 wherein said active medium element includes first and second end facets, said first end facet partially reflective so as to form said reflective means.

40. The laser of claim 32 further comprising a microlens disposed between said active medium element and said dispersive means for focusing radiation from said active medium element onto said dispersive means.

41. The laser of claim 40 wherein said microlens is a cylindrical lens.

42. The laser of claim 41 wherein said cylindrical lens is an optical fiber disposed within a V-groove formed in said optical platform.

43. The laser of claim 1 wherein said pump means includes means for applying a bias current to each of said different portions of said active medium.

* * * * *